United States Patent
Takao et al.

(10) Patent No.: US 9,953,433 B2
(45) Date of Patent: Apr. 24, 2018

(54) DISTANCE IMAGE ACQUISITION APPARATUS AND DISTANCE IMAGE ACQUISITION METHOD

(71) Applicant: FUJIFILM Corporation, Tokyo (JP)

(72) Inventors: Hiroaki Takao, Saitama (JP); Takeshi Misawa, Saitama (JP); Takeshi Kamiya, Saitama (JP); Tomonori Masuda, Saitama (JP); Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/712,545

(22) Filed: Sep. 22, 2017

(65) Prior Publication Data

US 2018/0012372 A1  Jan. 11, 2018

Related U.S. Application Data

(63) Continuation of application No. PCT/JP2015/081776, filed on Nov. 11, 2015.

(30) Foreign Application Priority Data

Mar. 30, 2015  (JP) .................................. 2015-069131

(51) Int. Cl.
  G06T 7/521 (2017.01)
  G01S 7/493 (2006.01)
  (Continued)

(52) U.S. Cl.
  CPC .............. G06T 7/521 (2017.01); G01S 7/493 (2013.01); G01S 17/89 (2013.01); G01S 17/08 (2013.01)

(58) Field of Classification Search
  CPC . G06T 7/521; G06T 2207/10028; G06T 7/50; G06T 1/0007; G06T 2207/10012;
  (Continued)

(56) References Cited

U.S. PATENT DOCUMENTS

| 4,240,105 A | * | 12/1980 | Faroudja | .................. H04N 9/78 348/668 |
| 2007/0156286 A1 | * | 7/2007 | Yamauchi | ............ G05D 1/0038 700/245 |

(Continued)

FOREIGN PATENT DOCUMENTS

| JP | 2005-221333 A | 8/2005 |
| JP | 2011-169701 A | 9/2011 |
| JP | 2014-115107 A | 6/2014 |

OTHER PUBLICATIONS

Japanese Decision to Grant a Patent for Japanese Application No. 2017-509157, dated Oct. 24, 2017, with an English Translation.
(Continued)

Primary Examiner — Jingge Wu
(74) Attorney, Agent, or Firm — Birch, Stewart, Kolasch & Birch, LLP

(57) ABSTRACT

A distance image acquisition apparatus includes a projection unit which projects a first pattern of structured light in a plurality of wavelength bandwidths, an imaging unit which is provided in parallel with and apart from the projection unit by a baseline length, performs imaging with sensitivities to a plurality of wavelength bandwidths, and generates a plurality of captured images corresponding to a plurality of wavelength bandwidths, a determination unit which determines whether or not a second pattern of structured light projected from another distance image acquisition apparatus is included in the captured images, and a pattern extraction unit which extracts the first pattern from a captured image determined as the second pattern being not included by the determination unit, and a distance image acquisition unit which acquires a distance image indicating a distance of a subject within a distance measurement region based on the first pattern.

7 Claims, 14 Drawing Sheets

(51) Int. Cl.
*G01S 17/89* (2006.01)
*G01S 17/08* (2006.01)

(58) Field of Classification Search
CPC .......... G01S 17/48; G01S 17/46; G01S 7/493;
G01S 17/89; G01S 7/497
See application file for complete search history.

(56) References Cited

U.S. PATENT DOCUMENTS

| | | | |
|---|---|---|---|
| 2007/0215706 A1* | 9/2007 | Kotlarsky | G06F 9/44526 235/462.07 |
| 2012/0194650 A1 | 8/2012 | Izadi et al. | |
| 2013/0002859 A1* | 1/2013 | Yamaguchi | G01S 17/48 348/135 |
| 2013/0010292 A1* | 1/2013 | Umeda | G01S 17/48 356/247 |
| 2013/0038882 A1 | 2/2013 | Umeda et al. | |
| 2013/0293716 A1* | 11/2013 | Breed | G01C 11/02 348/148 |
| 2015/0229911 A1* | 8/2015 | Ge | H04N 13/0239 348/47 |
| 2016/0069669 A1* | 3/2016 | Furihata | G01B 11/2536 356/610 |
| 2017/0070635 A1* | 3/2017 | Takahashi | G06F 3/017 |
| 2017/0309035 A1* | 10/2017 | Koda | G06T 7/529 |

OTHER PUBLICATIONS

International Preliminary Report on Patentability, issued in PCT/JP2015/081776, dated Oct. 6, 2016.
International Search Report, issued in PCT/JP2015/081776, dated Feb. 2, 2016.
Written Opinion of the International Searching Authority (PCT/ISA/237), issued in PCT/JP2015/081776, dated Feb. 2, 2016.

* cited by examiner

DISTANCE IMAGE ACQUISITION APPARATUS AND DISTANCE IMAGE ACQUISITION METHOD

CROSS-REFERENCE TO RELATED APPLICATIONS

The present application is a Continuation of PCT International Application No. PCT/JP2015/081776 filed on Nov. 11, 2015 claiming priority under 35 U.S.C § 119(a) to Japanese Patent Application No. 2015-69131 filed on Mar. 30, 2015. Each of the above applications is hereby expressly incorporated by reference, in their entirety, into the present application.

BACKGROUND OF THE INVENTION

1. Field of the Invention

The present invention relates to a distance image acquisition apparatus and a distance image acquisition method, and in particular, to a technique for projecting structured light distributed in a two-dimensional manner with respect to a subject within a distance measurement region and acquiring a distance image indicating a distance of the subject.

2. Description of the Related Art

Hitherto, this kind of distance image acquisition apparatus projects a dot pattern of structured light distributed in a two-dimensional manner with respect to a subject within a distance measurement region from a projection unit, images the subject with an imaging unit, and acquires a first image including the dot pattern reflected from the subject. Furthermore, the distance image acquisition apparatus images the subject with the imaging unit without projecting a dot pattern from the projection unit, acquires a second image to be a background of the dot pattern, subtracts the second image from the first image, and calculates and acquires the distance image (three-dimensional distance information) based on a subtraction result using a triangulation method (JP2011-169701A).

JP2014-115107A describes that one distance measurement apparatus comprises a plurality of projection units, and a plurality of projection units perform projection one by one in sequence to perform imaging or pattern light projected from a plurality of projection units is made to have different colors such that patterns projected from a plurality of projection units are not confused in an imaging unit.

SUMMARY OF THE INVENTION

In the distance image acquisition apparatus described in JP2011-169701A, in a case where a distance measurement of the same subject is performed simultaneously with a plurality of distance image acquisition apparatuses, dot patterns respectively projected from a plurality of distance image acquisition apparatuses are mixed, and there is a problem in that the distance image cannot be acquired. There is a case where a distance measurement of an object having such a size that a distance image cannot be acquired with one distance image acquisition apparatus should be performed simultaneously with a plurality of distance image acquisition apparatuses, or a case where a user himself or herself uses the distance image acquisition apparatus without knowing that another person is using the distance image acquisition apparatus. In particular, in a case where a distance image is used for other purposes without being directly displayed or the like, and the user himself or herself is unaware of distance image acquisition being performed, there is a high possibility that the distance image acquisition apparatus is used simultaneously at the same place.

The technique described in JP2014-115107A is a technique for, in a case where a plurality of projection units are provided in one apparatus, avoiding confusion between patterns in the imaging unit of one apparatus, and is difficult to be applied to a case where patterns are projected from a plurality of projection units respectively provided in a plurality of apparatuses.

The reason is as follows. As described in JP2014-115107A, in a case where a plurality of projection units are provided in one apparatus, a projection timing or a wavelength bandwidth is instructed from a central processing unit (CPU), which performs integral control in one apparatus, to each of a plurality of projection units, whereby it is possible to easily perform control of time division or wavelength bandwidth division (referred to as frequency division) of a plurality of projection units. Meanwhile, in a case where a projection unit is provided in each of a plurality of independent apparatuses, the projection timing or the wavelength bandwidth cannot be directly instructed from a CPU of a host apparatus to the projection units of another apparatus. Assuming a configuration in which a master apparatus which integrally controls a plurality of apparatuses is newly provided and the projection timing or the wavelength bandwidth is instructed from the master apparatus to each of a plurality of apparatuses as a slave apparatus through communication, since the master apparatus needs to be newly provided and the independence of each apparatus is impaired, in particular, the above-described technique is difficult to be applied to a terminal which is freely used by the user.

The invention has been accomplished in consideration of such a situation, and an object of the invention is to provide a distance image acquisition apparatus and a distance image acquisition method capable of acquiring a distance image with satisfactory accuracy based on a pattern projected from a host apparatus even in a case where patterns of structured light having the same shape are projected simultaneously from the host apparatus and another apparatus.

In order to attain the above-described object, a distance image acquisition apparatus according to an aspect of the invention comprises a projection unit which projects a first pattern of structured light distributed in a two-dimensional manner with respect to a subject within a distance measurement region in a plurality of wavelength bandwidths, an imaging unit which is provided in parallel with and apart from the projection unit by a baseline length, performs imaging with sensitivities to the plurality of wavelength bandwidths, and generates a plurality of captured images including the first pattern reflected from the subject and corresponding to the plurality of wavelength bandwidths, a determination unit which determines whether or not a second pattern of structured light projected from another distance image acquisition apparatus is included in the captured images, a pattern extraction unit which extracts the first pattern from at least a captured image determined as the second pattern being not included by the determination unit, and a distance image acquisition unit which acquires a distance image indicating a distance of the subject within the distance measurement region based on the first pattern extracted by the pattern extraction unit.

According to this configuration, the distance image is acquired based on the pattern (the first pattern projected from the host apparatus) in the captured image determined as the second pattern (the pattern projected from another apparatus) being not included by the determination unit. For this reason, even in a case where patterns of structured light having the same shape are projected simultaneously from the host apparatus and another apparatus, it is possible to acquire a distance image with satisfactory accuracy based on the first pattern projected from the host apparatus.

In regard to the projection unit, the expression "projects the first pattern of structured light in a plurality of wavelength bandwidths" means that "a function of projecting the first pattern of structured light in a plurality of wavelength bandwidths is provided". There are a case (simultaneous projection) of simultaneously projecting the first pattern in a plurality of wavelength bandwidths and a case (sequential projection) of projecting the first pattern while sequentially switching the wavelength bandwidths. The invention includes both cases. In regard to the imaging unit, the expression "performs imaging with sensitivities to a plurality of wavelength bandwidths and generates a plurality of captured images including the first pattern reflected from the subject and corresponding to a plurality of wavelength bandwidths" means that "a function of performing imaging with sensitivities to a plurality of wavelength bandwidths and generating a plurality of captured images including the first pattern reflected from the subject and corresponding to a plurality of wavelength bandwidths is provided". There are a case (simultaneous imaging) of performing imaging simultaneously in a plurality of wavelength bandwidths and a case (sequential imaging) of performing imaging while sequentially switching the wavelength bandwidths. The invention includes both cases. In regard to the imaging unit, the expression "generates the captured images" includes a case of reading an imaging signal, that is, a case of simply reading electric charge from the light receiving elements of the imaging unit as an imaging signal.

In regard to the determination unit, the expression "determines whether or not the second pattern of structured light projected from another distance image acquisition apparatus is included in the captured images" refers to a case of determining whether or not the second pattern is actually included in the captured image after imaging with the imaging unit and a case of determining whether or not the second pattern is included in the captured image in advance before imaging with the imaging unit. The invention includes both cases.

In regard to the extraction unit, the expression "extracts the first pattern from the captured image determined as the second pattern being not included by the determination unit" refers to a case where a pattern is extracted from the captured image in advance before the determination unit determines that the second pattern is not included (that is, a case where the extracted pattern is used for distance image acquisition as the first pattern after it is determined that the second pattern is not included) and a case where the first pattern is extracted from the captured image after the determination unit determines that the second pattern is not included. The invention includes both cases.

A distance image acquisition apparatus according to another aspect of the invention comprises a projection unit which projects a first pattern of structured light distributed in a two-dimensional manner with respect to a subject within a distance measurement region in a plurality of wavelength bandwidths, an imaging unit which is provided in parallel with and apart from the projection unit by a baseline length, performs imaging with sensitivities to the plurality of wavelength bandwidths, and generates a plurality of captured images including the first pattern reflected from the subject and corresponding to the plurality of wavelength bandwidths, a pattern extraction unit which extracts the first pattern from an added image obtained by adding the plurality of captured images, and a distance image acquisition unit which acquires a distance image indicating a distance of the subject within the distance measurement region based on the first pattern extracted by the pattern extraction unit.

According to this configuration, the first pattern is projected from the projection unit in a plurality of wavelength bandwidths, imaging is performed by the imaging unit with sensitivities to a plurality of wavelength bandwidths to generate a plurality of captured images corresponding to a plurality of wavelength bandwidths, and a pattern for distance image acquisition (the first pattern projected from the host apparatus) is extracted from the added image obtained by adding a plurality of captured images. For this reason, even in a case where the patterns of structured light having the same shape are projected simultaneously from the host apparatus and another apparatus, it is possible to acquire a distance image with satisfactory accuracy based on the first pattern projected from the host apparatus.

According to still another aspect of the invention, in the distance image acquisition apparatus, it is preferable that the first pattern and the second pattern are dot patterns, and in a case where the number of dots of a dot pattern in the captured image exceeds the number of dots of the first pattern projected from the projection unit, the determination unit determines that the second pattern is included in the captured image. That is, it is possible to quickly determine whether or not the second pattern projected from another apparatus is included in the captured image based on the number of dots.

According to still another aspect of the invention, it is preferable that the distance image acquisition apparatus further comprises a beacon information reception unit which receives beacon information indicating a wavelength bandwidth of projection of the second pattern from the another distance image acquisition apparatus, and the determination unit determines that the second pattern is included in a captured image in the wavelength bandwidth indicated by the beacon information. That is, it is possible to determine whether or not the second pattern is included in the captured image in advance before imaging without newly providing a master apparatus which integrally controls a plurality of distance image acquisition apparatuses.

According to still another aspect the invention, it is preferable that the distance image acquisition apparatus further comprises a light modulation unit which makes the first pattern be projected from the projection unit sequentially in the plurality of wavelength bandwidths, and the imaging unit performs imaging with a sensitivity only to a wavelength bandwidth of the first pattern during projection from the projection unit among the plurality of wavelength bandwidths in synchronization with switching of the wavelength bandwidths in the light modulation unit.

According to still another aspect of the invention, in the distance image acquisition apparatus, it is preferable that the projection unit projects the first pattern simultaneously in the plurality of wavelength bandwidths. It is preferable that the imaging unit has a plurality of types of light receiving elements having sensitivities to the plurality of wavelength bandwidths. That is, it is possible to generate a distance image at a high frame rate.

According to still another aspect of the invention, it is preferable that the distance image acquisition apparatus further comprises a transmission wavelength bandwidth switching device which switches a transmission wavelength bandwidth of light entering the imaging unit, and a transmission wavelength bandwidth control unit which switches the transmission wavelength bandwidth of light entering the imaging unit with the transmission wavelength bandwidth switching device to make the imaging unit perform imaging with sensitivities to the plurality of wavelength bandwidths.

A distance image acquisition method according to still another aspect of the invention comprises a step of projecting a first pattern of structured light distributed in a two-dimensional manner with respect to a subject within a distance measurement region from a projection unit in a plurality of wavelength bandwidths, a step of performing imaging with sensitivities to the plurality of wavelength bandwidths with an imaging unit provided in parallel with and apart from the projection unit by a baseline length, and generating a plurality of captured images including the first pattern reflected from the subject and corresponding to the plurality of wavelength bandwidths, a step of determining whether or not a second pattern of structured light projected from another distance image acquisition apparatus is included in the captured images, a step of extracting the first pattern from at least a captured image determined as the second pattern being not included, and a step of acquiring a distance image indicating a distance of the subject within the distance measurement region based on the extracted first pattern.

A distance image acquisition method according to still another aspect of the invention comprises a step of projecting a first pattern of structured light distributed in a two-dimensional manner with respect to a subject within a distance measurement region from a projection unit in a plurality of wavelength bandwidths, a step of performing imaging with sensitivities to the plurality of wavelength bandwidths with an imaging unit provided in parallel with and apart from the projection unit by a baseline length, and generating a plurality of captured images including the first pattern reflected from the subject and corresponding to the plurality of wavelength bandwidths, a step of extracting the first pattern from an added image obtained by adding the plurality of captured images, and a step of acquiring a distance image indicating a distance of the subject within the distance measurement region based on the extracted first pattern.

According to the invention, even in a case where the patterns of structured light having the same shape are projected simultaneously from the host apparatus and the another apparatus, it is possible to acquire a distance image with satisfactory accuracy based on the pattern projected from the host apparatus.

DESCRIPTION OF THE PREFERRED EMBODIMENTS

Hereinafter, an embodiment of a distance image acquisition apparatus and a distance image acquisition method according to the invention will be described referring to the accompanying drawings.

First Embodiment

Figure 1:
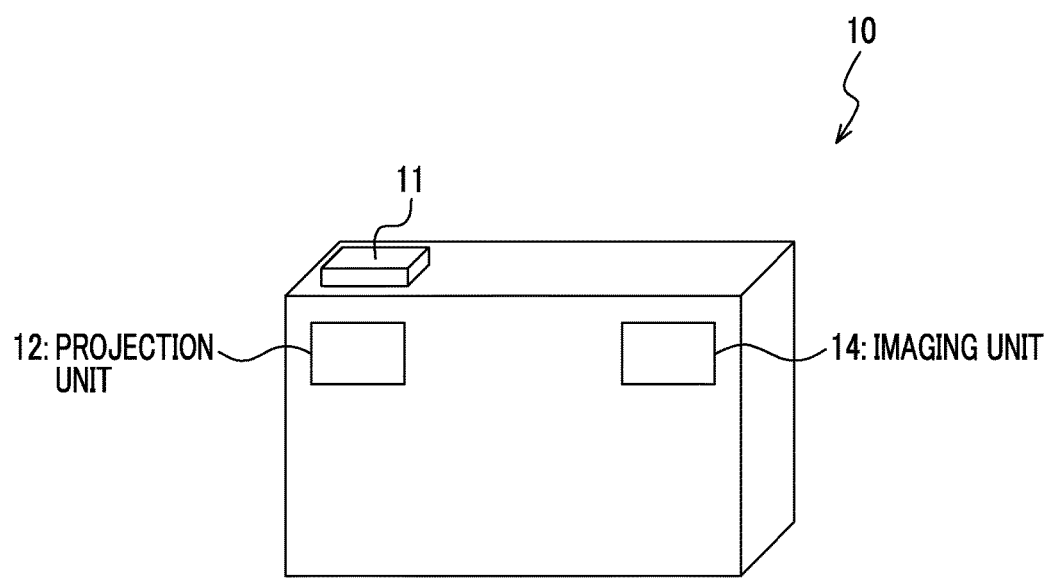
FIG. 1 is an appearance diagram showing a first embodiment of a distance image acquisition apparatus according to the invention.

FIG. 1 is an appearance diagram showing the appearance of an example of a distance image acquisition apparatus 10 according to the invention.

As shown in FIG. 1, the distance image acquisition apparatus 10 has a projection unit 12 and an imaging unit 14. Though will be described below in detail, in a case where an imaging instruction input by the operation of the shutter button 11 is applied, the distance image acquisition apparatus 10 acquires a distance image indicating a distance (depth information) of a subject within an imaging region (distance measurement region).

Figure 3:
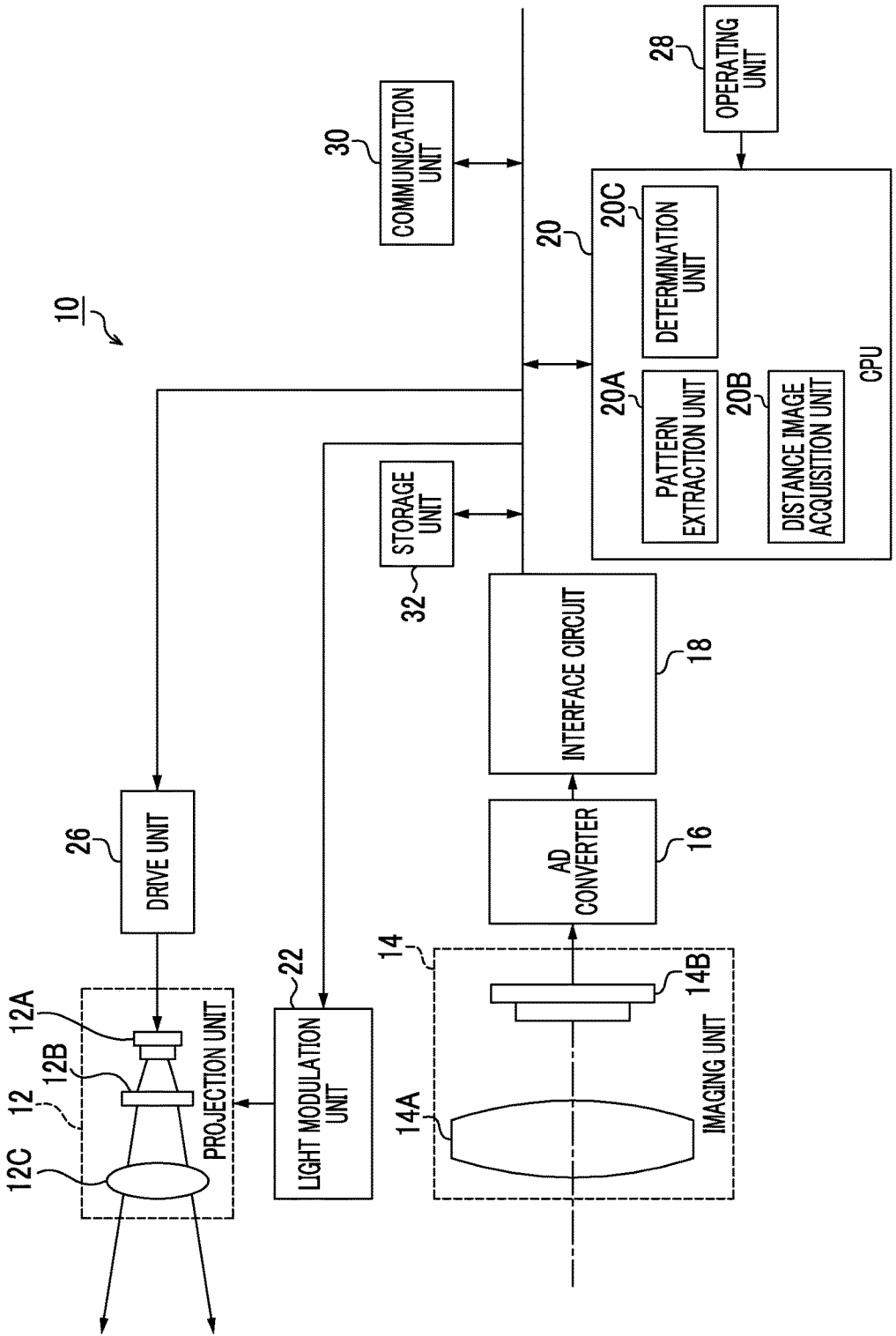
FIG. 3 is a block diagram showing an internal configuration example of the distance image acquisition apparatus of the first embodiment.

The distance image acquisition apparatus 10 has a static image mode in which a distance image for one frame is acquired like static image capturing and a video mode in which a distance image continuous at a predetermined frame rate (for example, 30 frames/second, 60 frames/second) is acquired like video capturing. The static image mode and the video mode can be appropriately selected by an operation of a mode selection unit of an operating unit 28 (FIG. 3). Then, in a case where a shutter button 11 is operated with one push when the static image mode is selected, a distance image for one frame is acquired. In a case where the shutter button 11 is operated with one push when the video mode is selected, acquisition of a distance image continuous at a predetermined frame rate is started, and in a case where the shutter button 11 is operated with one push again, distance image acquisition is stopped.

Figure 2:
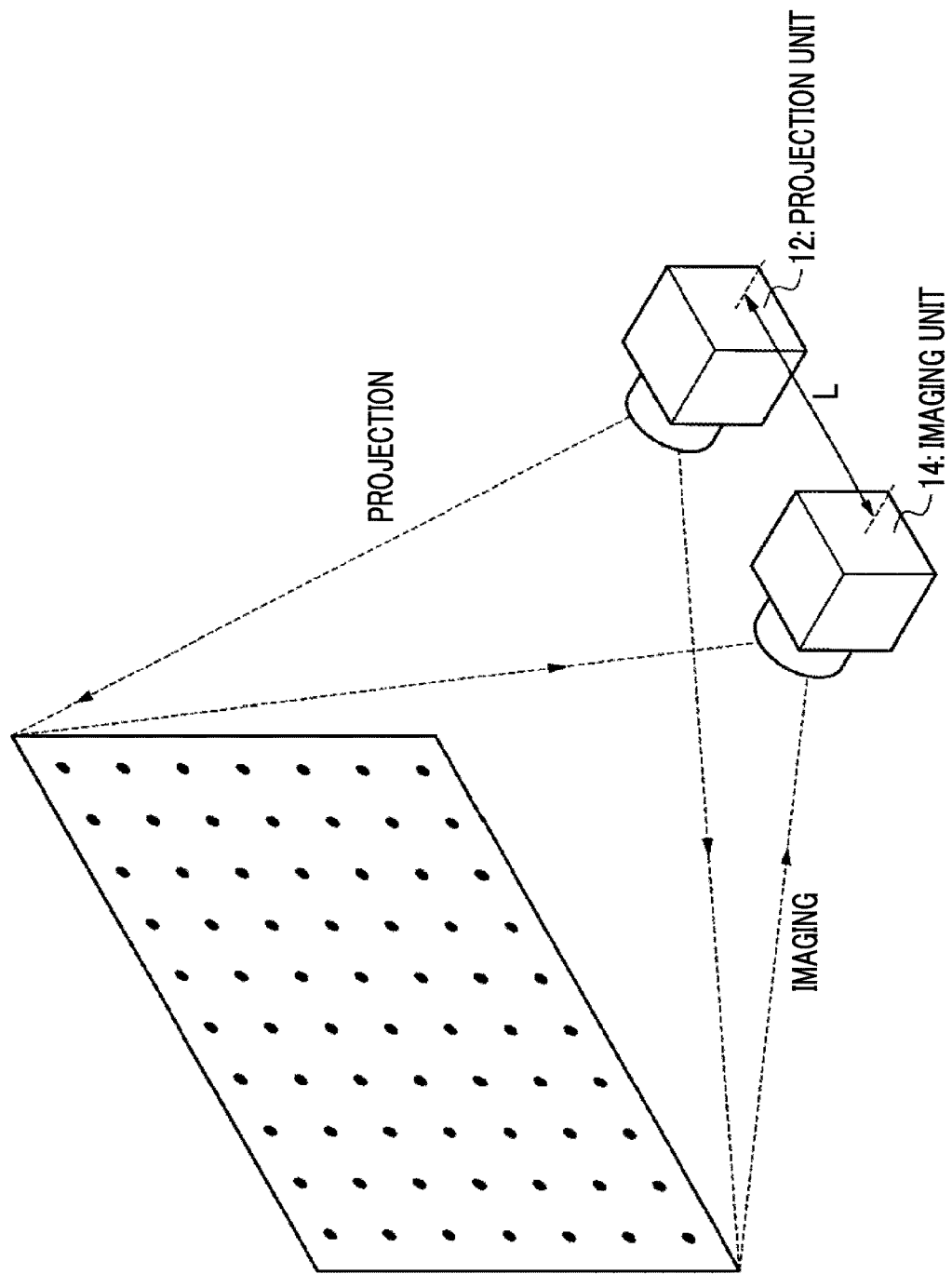
FIG. 2 is a diagram illustrating the principle of distance image acquisition in the distance image acquisition apparatus.

FIG. 2 is a diagram illustrating the principle of distance image acquisition in the distance image acquisition apparatus 10.

As shown in FIG. 2, at the time of acquisition of the distance image, the projection unit 12 projects a pattern (first pattern) of structured light distributed in a two-dimensional manner with respect to a subject within a distance measurement region. In this embodiment, as the first pattern of structured light, a matrix-shaped dot pattern is projected onto the subject. Hereinafter, the first pattern of structured light projected from the projection unit 12 may be referred to as a "first dot pattern".

The imaging unit 14 captures an image including the first dot pattern reflected from the subject. As shown in FIG. 2, the imaging unit 14 is provided in parallel with and apart from the projection unit 12 by a baseline length L, and parallax according to the distance of the subject is generated between the corresponding dots of the first dot pattern projected from the projection unit 12 and the first dot pattern imaged by the imaging unit 14. Accordingly, it is possible to obtain the distance image indicating the distance of the subject based on a light receiving position (not shown) of each dot of the first dot pattern projected from the projection unit 12 on an image sensor imaged by the imaging unit 14 using a triangulation method.

As shown in FIG. 2, although the projection unit 12 of this embodiment projects the matrix-shaped first dot pattern, the invention is not limited thereto, and the projection unit 12 may project a dot pattern in which a dot interval is random (pseudo random) or a mesh-shaped pattern.

FIG. 3 is a block diagram showing an internal configuration example of the distance image acquisition apparatus 10.

The distance image acquisition apparatus 10 comprises, in addition to the projection unit 12 and the imaging unit 14 described above, an analog-to-digital (AD) converter 16, an interface circuit 18, a central processing unit (CPU) 20, a light modulation unit 22, a drive unit 26, an operating unit 28, a communication unit 30, and a storage unit 32.

The projection unit 12 has a light emitting diode (LED) 12A, a diffraction optical element 12B, and a projection lens 12C functioning as a projection optical system. As the LED 12A, a near infrared LED may be used.

The diffraction optical element 12B functions as an element which converts a light intensity distribution using a diffraction phenomenon of light. In this example, light emitted from the LED 12A enters the diffraction optical element 12B, and the diffraction optical element 12B converts light to the matrix-shaped first dot pattern shown in FIG. 2. The projection lens 12C projects the first dot pattern of light converted by the diffraction optical element 12B onto the subject within the distance measurement region, which is the same as the imaging region (distance measurement region) of the imaging unit 14.

The imaging unit 14 is constituted of an imaging lens 14A and an image sensor 14B. The imaging lens 14A images reflected light (a light image including the first dot pattern projected from the projection unit 12 and reflected from the subject) from the subject on the image sensor 14B.

The image sensor 14B is constituted of a complementary metal-oxide semiconductor (CMOS) driver which has a vertical driver, a horizontal driver, and the like, and a CMOS type image sensor which is driven by a timing generator. The image sensor 14B is not limited to a CMOS type, and may be an XY address type or charge coupled device (CCD) type image sensor.

The image sensor 14B has a plurality of light receiving elements (photodiodes) arranged in a two-dimensional manner, and is provided with, on an incidence surface of a plurality of light receiving elements, a band-pass filter which transmits only light in a specific wavelength bandwidth or a cut filter which eliminates light in the wavelength bandwidths other than the specific wavelength bandwidth. With this, a plurality of light receiving elements of the image sensor 14B function as pixels having a sensitivity to light in the specific wavelength bandwidth.

In the image sensor 14B, an exposure period is controlled according to a timing signal (shutter control signal) applied from the timing generator (not shown), and electric charge corresponding to the amount of light entering in the exposure period is accumulated in each light receiving element of the image sensor 14B. Then, a pixel signal (an analog imaging signal corresponding to electric charge accumulated in each pixel) according to the amount of incident light of the first dot pattern reflected from the subject is read from the image sensor 14B. In a case where the subject is irradiated with ambient light and a component in the wavelength bandwidth of projection light projected from the projection unit 12 is included in ambient light, the component in the same wavelength bandwidth as projection light out of ambient light is included in the imaging signal as a noise signal.

The analog imaging signal read from the image sensor 14B is converted to a digital imaging signal (image data) by the AD converter 16, and is loaded on the CPU 20 by way of the interface circuit 18 functioning as an image input controller. A CMOS type image sensor may include an AD converter, and in this case, the AD converter 16 may be omitted.

Though details will be described below, the CPU 20 has a function as a device control unit which performs exposure control of the distance image acquisition apparatus 10 and integrally controls the respective units, such as the light modulation unit 22 and the drive unit 26 according to an instruction input on the operating unit 28, and a function as a pattern extraction unit 20A, a distance image acquisition unit 20B, and a determination unit 20C.

The pattern extraction unit 20A extracts the first dot pattern from the captured image as image data input through the interface circuit 18. For example, the pattern extraction unit 20A extracts image data (binary image data) indicating only the first dot pattern by setting a proper threshold value and binarizing input image data based on the threshold value.

The distance image acquisition unit 20B acquires (generates) the distance image indicating the distance of the subject within the distance measurement region based on the first dot pattern extracted by the pattern extraction unit 20A. For example, the distance image acquisition unit 20B obtains the position (for example, the position of the center of gravity of each dot) of each dot of the first dot pattern on the image sensor 14B based on binary image data indicating the first dot pattern, calculates the distance of the subject for each dot based on the obtained position of each dot of the first dot pattern on the image sensor 14B, and thus, acquires (generates) the distance image indicating the distance of the subject within the distance measurement region. While the distance image is two-dimensional distance information indicating the distance of the subject within the distance measurement region, the distance image can be visually recognized as an image by substituting the distance information with a brightness value or color information corresponding to the distance.

The determination unit 20C determines whether or not a pattern (second pattern) of structured light is projected from another distance image acquisition apparatus (hereinafter, simply referred to as "another apparatus"). Hereinafter, a case where a matrix-shaped dot pattern is projected from another apparatus onto the subject as the second pattern of structured light will be described as an example, and the second pattern of structured light projected from the another apparatus is referred to as a "second dot pattern". That is, the determination unit 20C determines whether or not the second dot pattern projected from another apparatus is included in the captured image.

The light modulation unit 22 temporally modulates the first dot pattern projected from the projection unit 12. The drive unit 26 drives the projection unit 12 according to an instruction from the CPU 20. The operating unit 28 includes a power switch, a shutter button 11, a mode selection unit, and the like, and an instruction input on the operating unit 28 is applied to the CPU 20. The communication unit 30 performs short-distance wireless communication with other peripherals or an access point. For example, the communication unit 30 performs transmission and reception of the beacon information and the like with another distance image acquisition apparatus. The storage unit 32 stores information necessary for distance image acquisition and a program which is executed on the CPU 20.

Next, the configuration of a main part of this embodiment in which a distance image is acquired based on only a dot pattern (first dot pattern) projected from the host apparatus even in a case where dot patterns are projected simultaneously from the host apparatus and another apparatus will be described.

The projection unit 12 projects the first dot pattern with respect to the subject within the distance measurement region in a plurality of wavelength bandwidths. The imaging unit 14 performs imaging with sensitivities to a plurality of wavelength bandwidths and generates a plurality of captured images including the first dot pattern reflected from the subject and corresponding to a plurality of wavelength bandwidths. The pattern extraction unit 20A extracts the dot pattern from the captured image. The determination unit 20C determines the second dot pattern is included in the captured image in a case where the number of dots of a dot pattern in the captured image exceeds the number of dots of the first dot pattern projected from the projection unit 12, and determines that the second dot pattern is not included in the captured image in a case where the number of dots of the dot pattern in the captured image is equal to or less than the number of dots of the first dot pattern projected from the projection unit 12. The distance image acquisition unit 20B acquires the distance image indicating the distance of the subject within the distance measurement region based on the dot pattern (first dot pattern) extracted by the pattern extraction unit 20A from the captured image determined as the second dot pattern being not included by the determination unit 20C.

Figure 4:
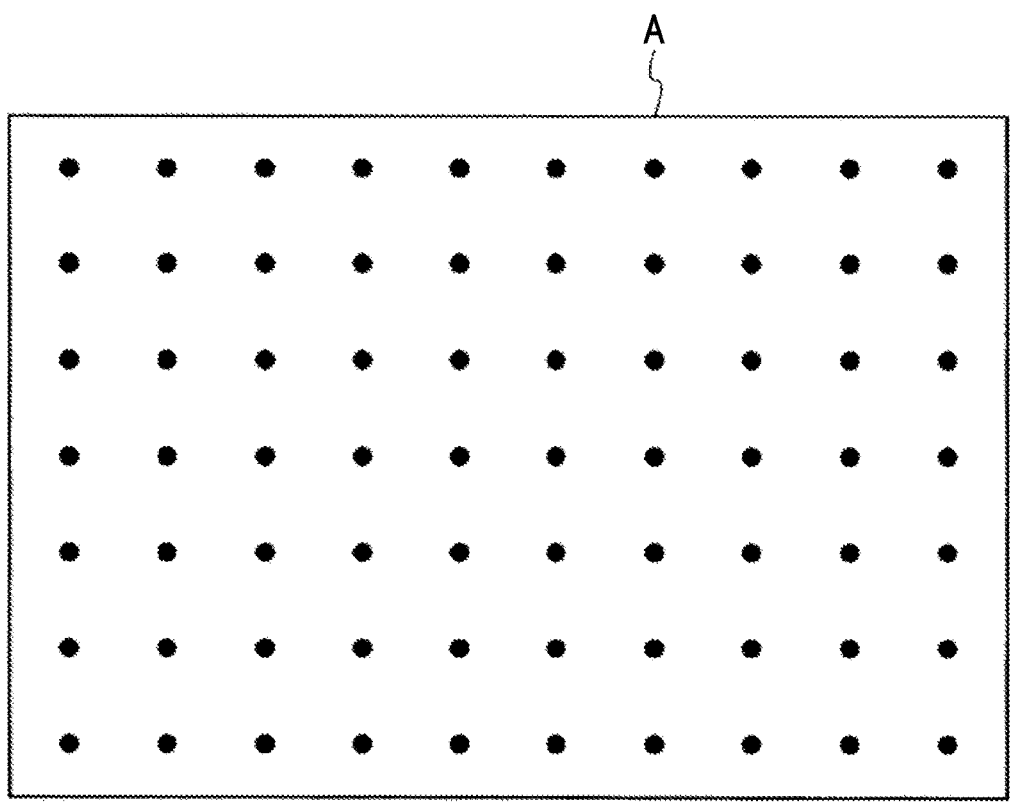
FIG. 4 is a diagram showing an example of a captured image obtained by imaging in a state in which a dot pattern is not projected from another apparatus when a dot pattern is projected from a host apparatus.
Figure 5:
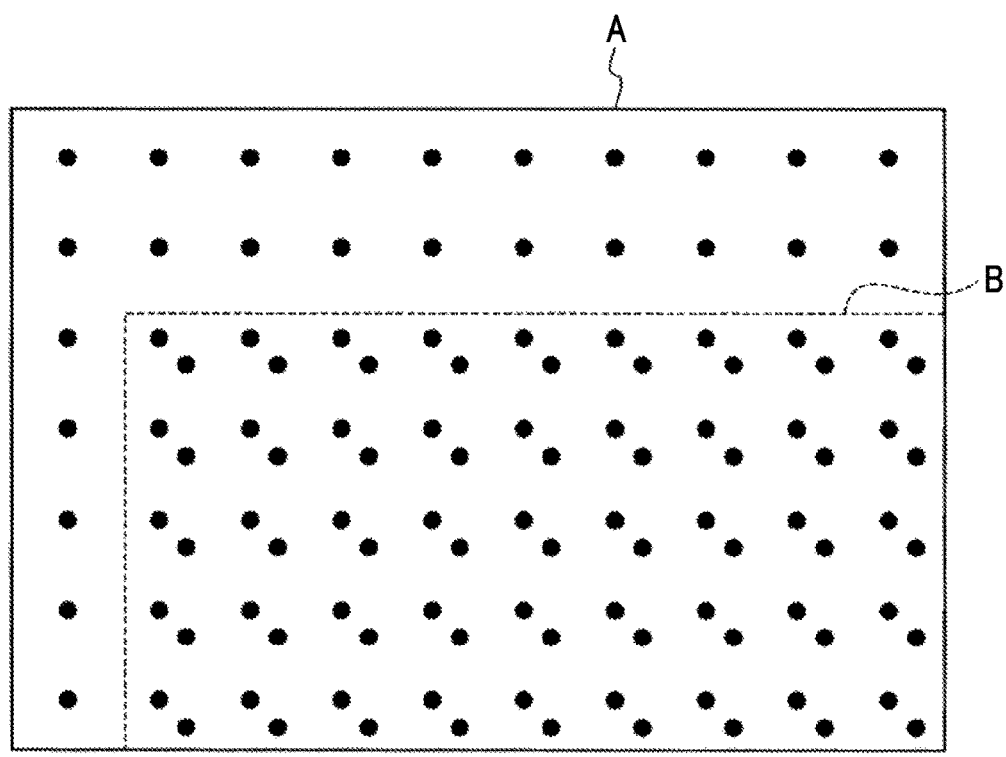
FIG. 5 is a diagram showing an example of a captured image obtained by imaging in a state in which a dot pattern is projected from another apparatus when a dot pattern is projected from the host apparatus.

FIG. 4 is a diagram showing an example of a captured image obtained by imaging with the imaging unit 14 in a state in which a dot pattern is not projected from another apparatus when a dot pattern is projected from the host apparatus. Since the captured image shown in FIG. 4 includes only the first dot pattern projected from the projection unit 12 of the host apparatus and reflected from the subject within a distance measurement region A, it is possible to extract the first dot pattern by performing simple image processing, such as the binarization processing using the above-described threshold. However, in a case where the second dot pattern is projected from another apparatus when the first dot pattern is projected from the host apparatus and the wavelength bandwidth of projection of the first dot pattern of the host apparatus overlaps the wavelength bandwidth of projection of the second dot pattern of another apparatus, as shown in FIG. 5, since an overlap region B where first dot pattern and the second dot pattern overlap each other is present within the distance measurement region A of the captured image obtained by imaging with the imaging unit 14, and the first dot pattern and the second dot pattern have the same dot shape, it is not possible to extract only the first dot pattern.

However, according to the above-described configuration, the distance image indicating the distance of the subject within the distance measurement region is acquired based on the dot pattern (first dot pattern) extracted by the pattern extraction unit 20A from the captured image determined as the second dot pattern being not included by the determination unit 20C.

Figure 6:
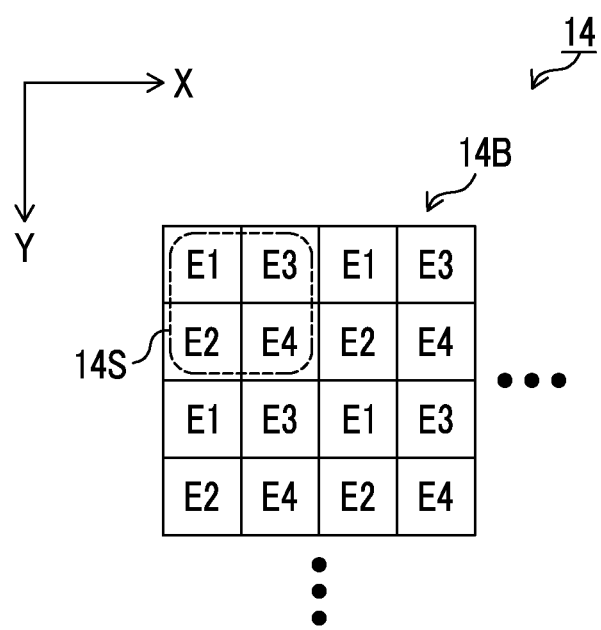
FIG. 6 is a diagram showing a light receiving element arrangement of an example of an imaging unit which performs imaging with sensitivities to a plurality of wavelength bandwidths.

FIG. 6 is a diagram showing a light receiving element arrangement of an example of the imaging unit 14 which performs imaging with sensitivities to a plurality of wavelength bandwidths. The image sensor 14B of the imaging unit 14 of this example has a configuration in which light receiving element sets 14S each having four types of light receiving elements (a first light receiving element E1, a second light receiving element E2, a third light receiving element E3, and a fourth light receiving element E4) with different light receiving wavelength bandwidths adjacent to one another are arranged on one plane (light receiving surface) in a two-dimensional manner. In this example, although the number of wavelength bandwidths is "four", the number of wavelength bandwidths in the invention is not particularly limited, and the number of wavelength bandwidths may be "two" or "three", or may be equal to or greater than "five". That is, the number of types of light receiving elements constituting the light receiving element set 14S is not limited to "four".

In order to perform imaging with sensitivities to a plurality of wavelength bandwidths, a band-pass filter or a cut filter is provided on an incidence surface of a plurality of light receiving elements E1, E2, E3, and E4. A band-pass filter or a cut filter may be arranged in various aspects. For example, there is an aspect in which a band-pass filter which transmits only light in a first wavelength bandwidth is provided in the first light receiving element E1, a band-pass filter which transmits only light in a second wavelength bandwidth is provided in the second light receiving element E2, a band-pass filter which transmits only light in a third wavelength bandwidth is provided in the third light receiving element E3, and a band-pass filter which transmits only light in a fourth wavelength bandwidth is provided in the fourth light receiving element E4. In reality, for a reason, such as difficulty in manufacturing a band-pass filter capable of transmitting only each wavelength bandwidth or costs, an aspect using a cut filter can be employed. A configuration may be made in which no filter is provided in one of a plurality of light receiving elements.

Imaging in the following two imaging modes becomes possible using the imaging unit 14 having the light receiving element arrangement of FIG. 6.

In a first imaging mode, the projection unit 12 in which a plurality of types of LEDs 12A configured to emit light in a plurality of wavelength bandwidths (in this example, four wavelength bandwidths) are provided is used, and the first dot pattern is projected from the projection unit 12 sequentially in a plurality of wavelength bandwidths by the light modulation unit 22. In the first imaging mode, the imaging unit 14 perform imaging with a sensitivity to at least the wavelength bandwidth of the first dot pattern being projected from the projection unit 12 among a plurality of wavelength bandwidths in synchronization with switching of the wavelength bandwidths in the light modulation unit 22.

In a second imaging mode, the projection unit 12 in which a plurality of types of LEDs 12A configured to emit light in a plurality of wavelength bandwidths (in this example, four wavelength bandwidths) are provided or an LED 12A configured to emit light over a plurality of wavelength bandwidths is provided is used, and the first dot pattern is projected from the projection unit 12 simultaneously in a plurality of wavelength bandwidths by the light modulation unit 22. In the second imaging mode, the imaging unit 14 performs imaging simultaneously in a plurality of wavelength bandwidths with sensitivities to a plurality of wavelength bandwidths.

Figure 7:
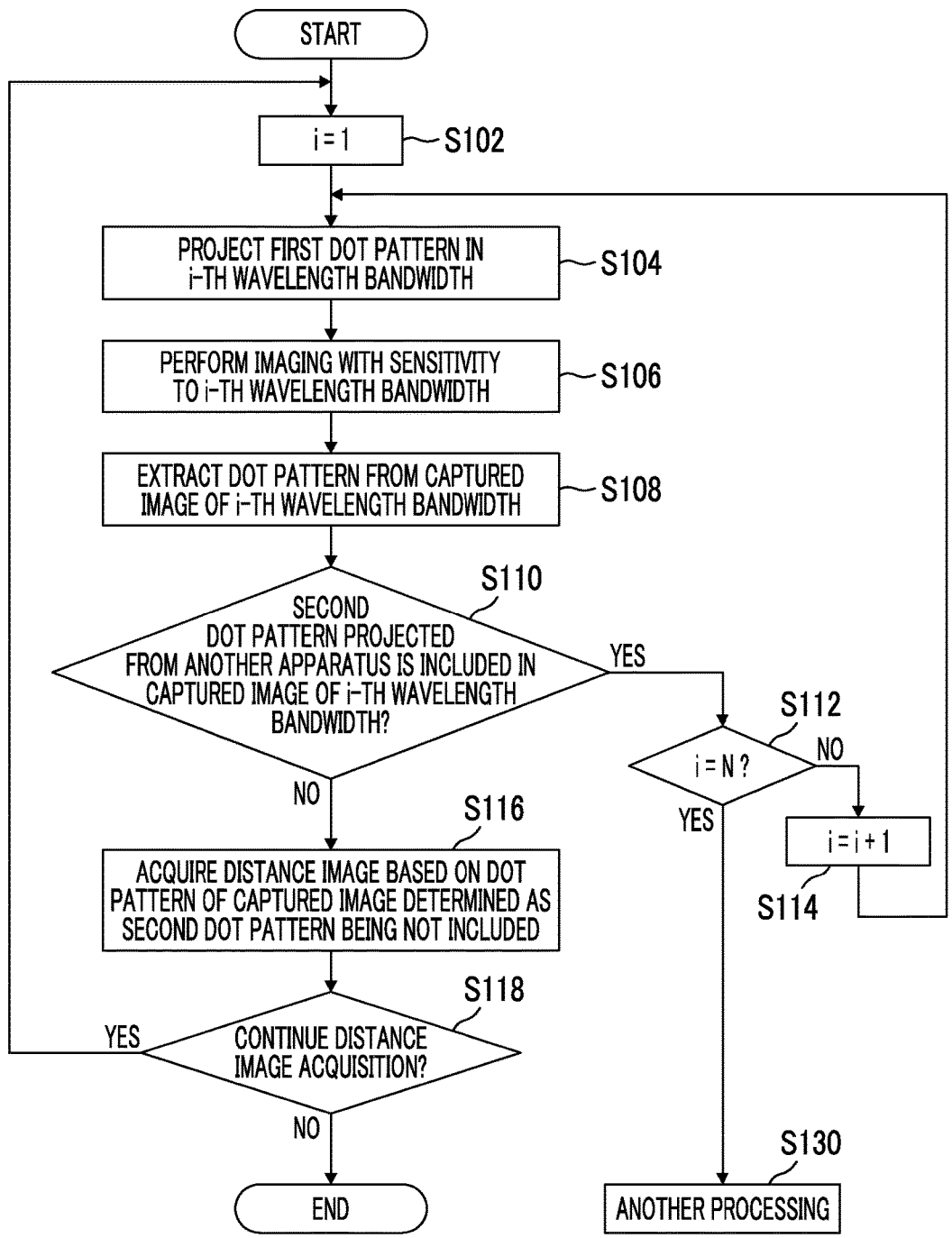
FIG. 7 is a flowchart showing the flow of processing of an example of a distance image acquisition method in the first embodiment.

FIG. 7 is a flowchart showing the flow of processing of an example of a distance image acquisition method using the distance image acquisition apparatus 10 of the first embodiment, and primarily shows the flow of processing which is executed according to a program under the control of the CPU 20. This processing is distance image acquisition processing in the video mode, and for example, starts in a case where the shutter button 11 is operated with one push.

First, the CPU 20 sets a variable i indicating a wavelength bandwidth to "1" as an initial value (Step S102).

Next, the projection unit 12 is made to project the first dot pattern in an i-th wavelength bandwidth (Step S104).

Next, the imaging unit 14 is made to perform imaging with a sensitivity to the i-th wavelength bandwidth (Step S106). An analog imaging signal (captured image) generated by the imaging unit 14 is converted to a digital imaging signal by the AD converter 16 and is stored in the storage unit 32 by the interface circuit 18. That is, the captured image (hereinafter, referred to as a "captured image in the i-th wavelength bandwidth") including the first dot pattern projected from the projection unit 12 in the i-th wavelength bandwidth is stored in the storage unit 32.

Next, the pattern extraction unit 20A extracts the dot pattern from the captured image in the i-th wavelength bandwidth (Step S108).

Next, the determination unit 20C determines whether or not the second dot pattern projected from another apparatus is included in the captured image in the i-th wavelength bandwidth (Step S110). In this embodiment, in a case where the number of dots of the dot pattern extracted from the captured image exceeds the number of dots of the first dot pattern projected from the projection unit 12, it is determined that the second dot pattern is included in the captured image.

For example, in a case where the first dot pattern shown in FIG. 4 is projected from the projection unit 12, the number of dots of the first dot pattern is 70. For example, as shown in FIG. 5, in a case where the overlap region B where the first dot pattern and the second dot pattern overlap each other is present within the distance measurement region A of the captured image, the number of dots of the dot pattern detected from the captured image exceeds the number of dots (in FIG. 4, 70) of the first dot pattern projected from the projection unit 12 of the host apparatus. In FIG. 5, the number of dots of the dot pattern detected from the captured image is 115 (=70+45). In this way, in a case where the number of dots of the dot pattern extracted from the captured image exceeds the number of dots of the first dot pattern actually projected, the determination unit 20C determines that the second dot pattern is included in the captured image.

In a case where it is determined that the second dot pattern is included in the captured image in the i-th wavelength bandwidth (in a case where the determination result in Step S110 is YES), the CPU 20 determines whether or not the variable i indicating the wavelength bandwidth is equal to the number of wavelength bandwidths N (in this example, "4") (Step S112). In a case where the determination result in Step S112 is NO, the variable i indicating the wavelength bandwidth is incremented (i=i+1) (Step S114), the process returns to Step S104, and projection, imaging, and pattern extraction are performed in the next wavelength bandwidth (Steps S104 to S108).

In a case where it is determined that the second dot pattern is not included in the captured image in the i-th wavelength bandwidth (in a case where the determination result in Step S110 is NO), the distance image acquisition unit 20B acquires the distance image based on the dot pattern (that is, the first dot pattern) extracted from the captured image in the i-th wavelength bandwidth (Step S116).

The CPU 20 determines whether or not to continue the distance image acquisition (Step S118). In a case where it is determined to continue the distance image acquisition (in a case where the determination result in Step S118 is YES), the CPU 20 initializes the variable i indicating the wavelength bandwidth to "1" (Step S102), and repeats Steps S104 to S118. In a case where it is determined not to continue the distance image acquisition (in a case where the determination result in Step S118 is NO), this processing ends. This processing is the distance image acquisition in the video mode, and ends in a case where the shutter button 11 is operated with one push again.

In a case where the second dot pattern is projected from another apparatus in all wavelength bandwidths, the determination result in Step S112 is YES, and the CPU 20 executes another processing (Step S130). Another processing may be appropriately performed, and for example, it is preferable that a distance image is acquired by another distance image acquisition processing according to an embodiment different from this example. In distance image acquisition in an environment in which there is no possibility that another apparatus projects the second dot pattern over all of a plurality of wavelength bandwidths, usually, since the process does not progress to another processing (Step S130), error processing may be performed as another processing. Even in an environment in which there is a possibility that another apparatus projects the second dot pattern over all of a plurality of wavelength bandwidths, in a case where the possibility is low, for example, standby processing for standing by until projection of the second dot pattern from the another apparatus ends may be performed.

Figure 8:
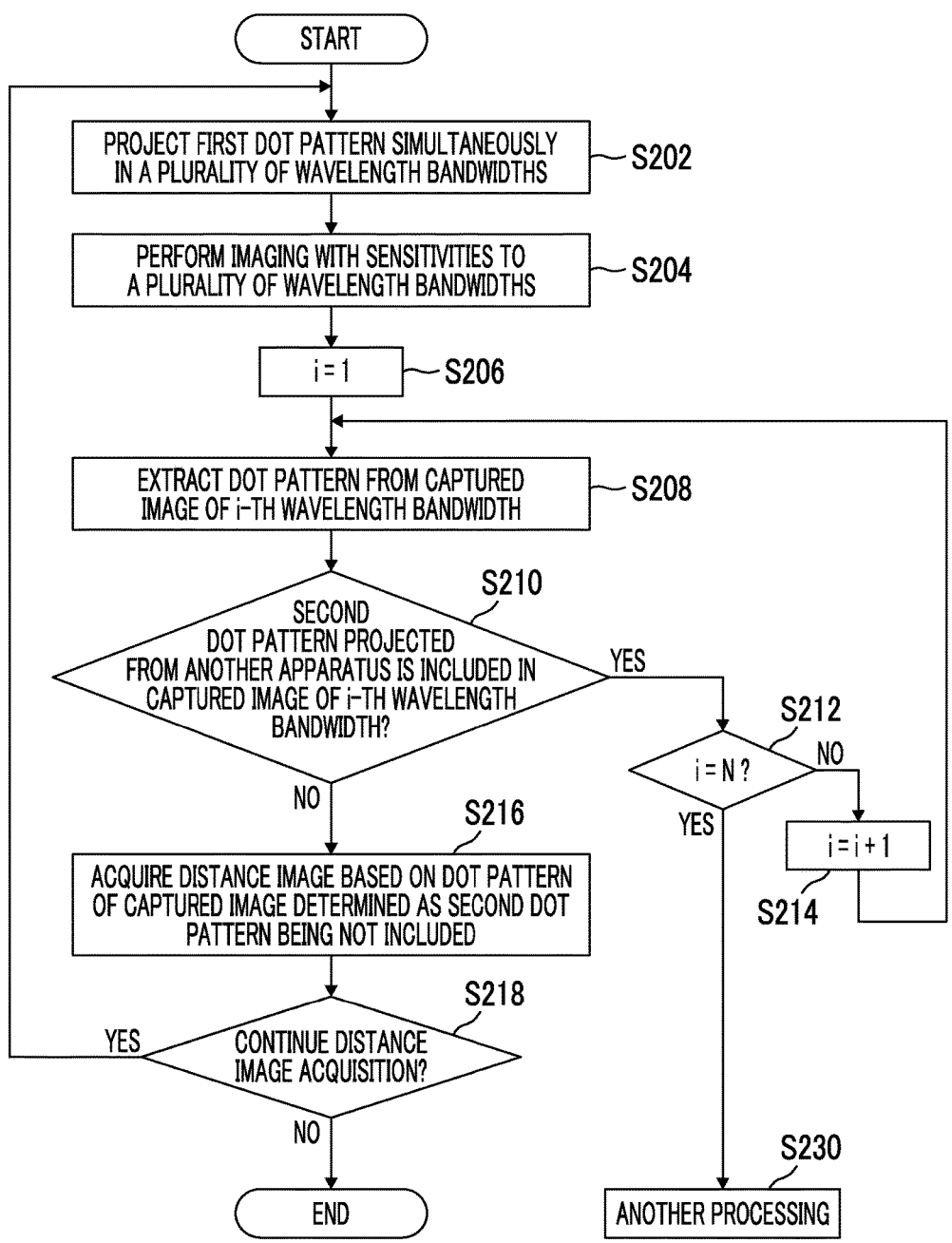
FIG. 8 is a flowchart showing the flow of processing of another example of the distance image acquisition method in the first embodiment.

FIG. 8 is a flowchart showing the flow of processing of another example of the distance image acquisition method using the distance image acquisition apparatus 10 of the first embodiment, and primarily shows the flow of processing which is executed according to a program under the control of the CPU 20. This processing is distance image acquisition processing in the video mode, and for example, starts in a case where the shutter button 11 is operated with one push.

First, the projection unit 12 is made to project the first dot pattern onto the subject within the distance measurement region simultaneously in a plurality of wavelength bandwidths (Step S202). That is, in a case where the number of wavelength bandwidths is "N", the first dot pattern is projected in a wide wavelength bandwidth from the first wavelength bandwidth to the N-th wavelength bandwidth.

Next, the imaging unit 14 is made to image the subject within the distance measurement region with sensitivities to a plurality of wavelength bandwidths (the wavelength bandwidths from the first wavelength bandwidth to the N-th wavelength bandwidth) (Step S204). That is, N captured images including a captured image in the first wavelength bandwidth to a captured image in the N-th wavelength bandwidth are stored in the storage unit 32.

Next, the CPU 20 sets the variable i indicating the wavelength bandwidth to "1" as the initial value (Step S206).

Next, the pattern extraction unit 20A extracts the dot pattern from the captured image in the i-th wavelength bandwidth (Step S208).

Next, the determination unit 20C determines whether or not the second dot pattern projected from another apparatus is included in the captured image in the i-th wavelength bandwidth (Step S210).

In a case where it is determined that the second dot pattern is included in the captured image in the i-th wavelength bandwidth (in a case where the determination result in Step S210 is YES), the CPU 20 determines whether or not the variable i indicating the wavelength bandwidth is equal to the number of wavelength bandwidths N (Step S212). In a case where the determination result in Step S212 is NO, the variable i indicating the wavelength bandwidth is incremented (i=i+1) (Step S214), and dot pattern extraction is performed in the next wavelength bandwidth (Step S208).

In a case where it is determined that the second dot pattern is not included in the captured image in the i-th wavelength bandwidth (in a case where the determination result in Step S210 is NO), the distance image acquisition unit 20B acquires the distance image based on the dot pattern (that is, the first dot pattern) extracted from the captured image of the i-th wavelength bandwidth (Step S216).

The CPU 20 determines whether or not to continue the distance image acquisition (Step S218). In a case where it is determined to continue the distance image acquisition (in a case where the determination result in Step S218 is YES), the CPU 20 repeats Steps S202 to S218. In a case where it is determined not to continue the distance image acquisition (in a case where the determination result in Step S218 is NO), this processing ends. This processing is the distance image acquisition in the video mode, and ends in a case where the shutter button 11 is operated with one push again.

Step S230 is the same as Step S130 shown in FIG. 7, and description thereof will not be repeated.

Second Embodiment

The internal configuration of a distance image acquisition apparatus 10 of a second embodiment will be described referring to FIG. 3. Hereinafter, a difference from the distance image acquisition apparatus 10 of the first embodiment will be primarily described, and the contents already described in the first embodiment will not be repeated.

The communication unit 30 of this embodiment receives beacon information including information (hereinafter, referred to as "wavelength bandwidth information") indicating the wavelength bandwidth of projection of the second dot pattern from another apparatus (another distance image acquisition apparatus) directly or through an access point. That is, the communication unit 30 functions as a beacon information reception unit.

The determination unit 20C of this embodiment determines that the second dot pattern is included in a captured image in a wavelength bandwidth indicated by the wavelength bandwidth information in the beacon information.

Figure 9:
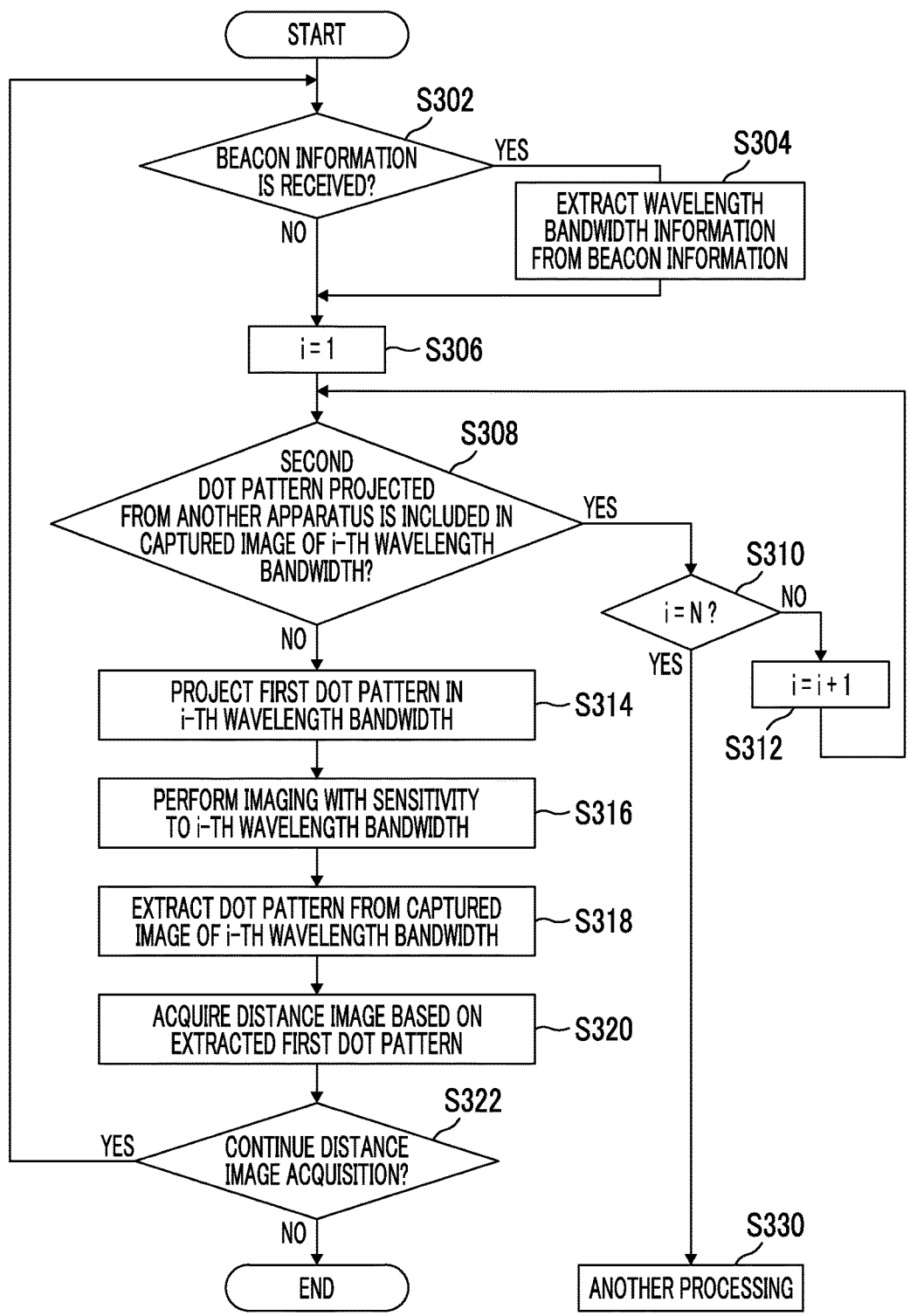
FIG. 9 is a flowchart showing the flow of processing of an example of a distance image acquisition method in a second embodiment.

FIG. 9 is a flowchart showing the flow of processing of an example of a distance image acquisition method of the second embodiment, and primarily shows the flow of processing which is executed according to a program under the control of the CPU 20. This processing is distance image acquisition processing in the video mode, and for example, starts in a case where the shutter button 11 is operated with one push.

First, the CPU 20 determines whether or not the beacon information sent from another distance image acquisition apparatus 10 is received by the communication unit 30 (Step S302). In a case where another distance image acquisition apparatus 10 is present within a communicable range of the beacon information and another distance image acquisition apparatus 10 sends the beacon information, the beacon information is received by the communication unit 30. The communication unit 30 stores the received beacon information in the storage unit 32 with a time stamp attached to the beacon information. The CPU 20 refers to the time stamp attached to the beacon information, thereby determining whether or not the beacon information is received within a given time.

In a case where the beacon information is received by the communication unit 30 (in a case where the determination result in Step S302 is YES), the CPU 20 extracts the wavelength bandwidth information from the received beacon information (Step S304).

Next, the CPU 20 sets the variable i indicating the wavelength bandwidth to "1" as the initial value (Step S306).

Next, the determination unit 20C determines whether or not the second dot pattern projected from another apparatus is included in the captured image of the i-th wavelength bandwidth (Step S308). That is, the determination unit 20C determines that the second dot pattern is included in the captured image in the i-th wavelength bandwidth in a case where the wavelength bandwidth information in the beacon information indicates the i-th wavelength bandwidth, and determines that the second dot pattern is not included in the captured image in the i-th wavelength bandwidth in a case where the wavelength bandwidth information in the beacon information indicates a wavelength bandwidth different from the i-th wavelength bandwidth.

In a case where it is determined that the second dot pattern is included in the captured image in the i-th wavelength bandwidth (in a case where the determination result in Step S308 is YES), the CPU 20 determines whether or not the variable i indicating the wavelength bandwidth is equal to the number of wavelength bandwidths N (Step S310). In a case where the determination result in Step S310 is NO, the variable i indicating the wavelength bandwidth is incremented (i=i+1) (Step S312), the process returns to Step S308, and determination in the next wavelength bandwidth is performed (Step S308).

In a case where it is determined that the second dot pattern is not included in the captured image in the i-th wavelength bandwidth (in a case where the determination result in Step S308 is NO), the projection unit 12 projects the first dot pattern in the i-th wavelength bandwidth (Step S314), the imaging unit 14 performs imaging with a sensitivity to at least the i-th wavelength bandwidth (Step S316), the pattern extraction unit 20A extracts the first dot pattern from the captured image in the i-th wavelength bandwidth (Step S318), and the distance image acquisition unit 20B acquires the distance image based on the first dot pattern (Step S320).

The CPU 20 determines whether or not to continue the distance image acquisition (Step S322), in a case where it is determined to continue the distance image acquisition (in a case where the determination result in Step S322 is YES), repeats Steps S302 to S322. In a case where it is determined not to continue the distance image acquisition (in a case where the determination result in Step S322 is NO), this processing ends. This processing is the distance image acquisition in the video mode, and ends in a case where the shutter button 11 is operated with one push again.

Step S330 is the same as Step S130 shown in FIG. 7, and description thereof will not be repeated.

Third Embodiment

Figure 10:
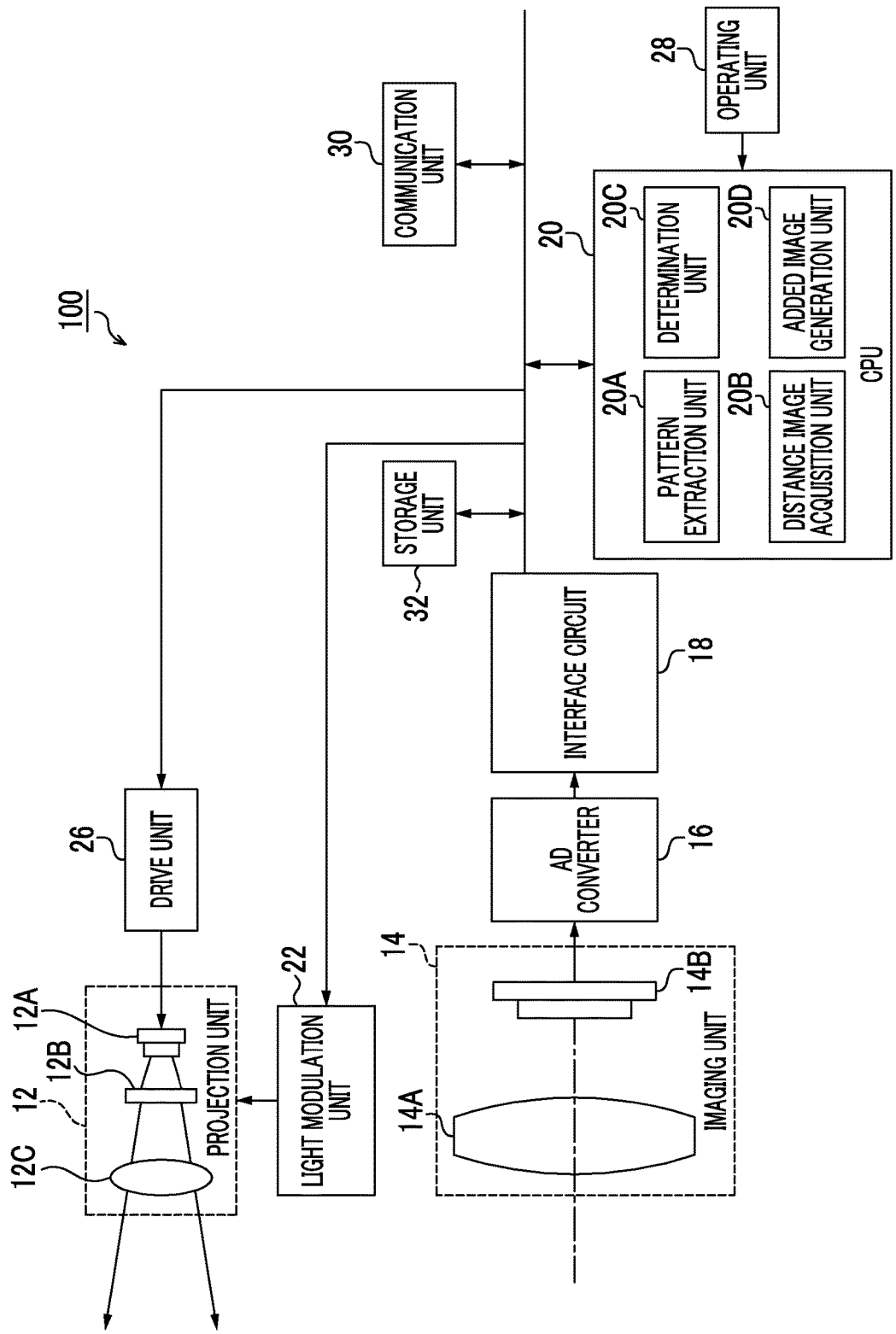
FIG. 10 is a block diagram showing an internal configuration example of a distance image acquisition apparatus of a third embodiment.

FIG. 10 is a block diagram showing an internal configuration example of a distance image acquisition apparatus 100 according to a third embodiment of the invention. In FIG. 10, the same components as those of the distance image acquisition apparatus 10 of the first embodiment shown in FIG. 3 are represented by the same reference numerals. Hereinafter, a difference from the first embodiment will be primarily described, and the contents already described in the first embodiment will not be repeated.

The CPU 20 of the distance image acquisition apparatus 100 of this embodiment comprises the pattern extraction unit 20A, the distance image acquisition unit 20B, the determination unit 20C, and an added image generation unit 20D.

The projection unit 12 projects the first dot pattern with respect to the subject within the distance measurement region simultaneously in a plurality of wavelength bandwidths. The imaging unit 14 performs imaging with sensitivities to a plurality of wavelength bandwidths and generates a plurality of captured images including the first dot pattern reflected from the subject and corresponding to a plurality of wavelength bandwidths. The added image generation unit 20D adds a plurality of captured images to generate an added image. The pattern extraction unit 20A extracts the first dot pattern from the added image. The distance image acquisition unit 20B acquires the distance image indicating the distance of the subject within the distance measurement region based on the first dot pattern extracted by the pattern extraction unit 20A. In this embodiment, while the determination unit 20C can be omitted, as described below, it is preferable that the determination unit 20C is used to acquire a distance image with more satisfactory accuracy.

Next, an extraction example of the first dot pattern from the added image by the pattern extraction unit 20A will be described.

Figure 11:
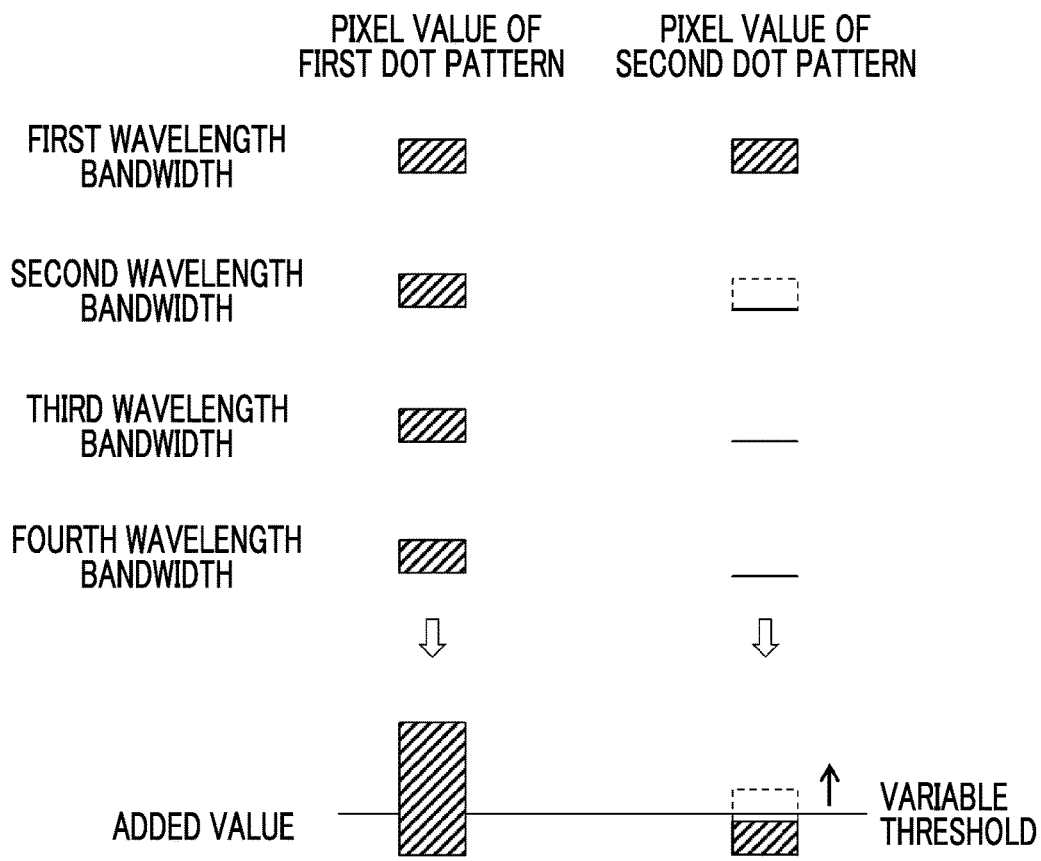
FIG. 11 is an explanatory view illustrating a difference between added values of a first pattern projected from a host apparatus and a second pattern projected from another apparatus.

It is assumed that the first dot pattern is projected in the form of a continuous wave from the host apparatus simultaneously in a plurality of wavelength bandwidths (in this example, four wavelength bandwidths including a first wavelength bandwidth to a fourth wavelength bandwidth), and the second dot pattern is projected in the form of a continuous wave from another apparatus in one wavelength bandwidth. Exposure is performed by the imaging unit 14 during a given exposure period, and pixel values (corresponding to the amount of electric charge accumulated in the light receiving elements) are added over a plurality of wavelength bandwidths by the added image generation unit 20D. Then, as shown in FIG. 11, a large difference is generated between the added values of the first dot pattern projected from host apparatus simultaneously in a plurality of wavelength bandwidths and the second dot pattern projected from another apparatus. Even in a case where projection is performed in the form of a pulsed wave instead of a continuous wave, an appropriate difference can be generated between the added values by appropriately setting the exposure period (light receiving period) in the imaging unit 14.

Accordingly, the pattern extraction unit 20A determines that the pixels having the added value (the pixel value of the added image) equal to or greater than a threshold among a plurality of pixels constituting the dot pattern in the added image are the pixels of the first dot pattern. The pattern extraction unit 20A determines that the pixels having the added value less than the threshold are the pixels of the second dot pattern. That is, binarization processing is performed based on the threshold, thereby separating and extracting image data (binary image data) indicating only the first dot pattern from the added image.

In a case where there are overlaps of the dots of the first dot pattern and the second dot pattern in the added image, the pixels constituting the overlaps of the dots are determined to be the pixels of the first dot pattern.

As another aspect, there is an aspect using a histogram. Specifically, a histogram indicating an appearance frequency of a pixel value for a plurality of pixels constituting the dot pattern in the added image is generated, classification is made into a group of first pixels and a group of second pixels having a pixel value relatively lower than the group of first pixels, and a dot pattern constituted of only the group of the first pixels is identified as the first dot pattern. In this way, it is possible to separate and extract only the first dot pattern from the added image using the histogram.

On the other hand, in a case where the second dot pattern is projected from another apparatus in a plurality of wavelength bandwidths (however, the number of wavelength bandwidths is smaller than that of the host apparatus), as indicated by a dotted line in FIG. 11, the added value of the second dot pattern becomes greater than the threshold depending on the magnitude of the threshold. In such a case, since the determination unit 20C determines that the number of dots of the dot pattern extracted from the added image exceeds the number of dots of the first dot pattern actually projected from the projection unit 12, the pattern extraction unit 20A increases the threshold and re-extracts the dot pattern from the added image. That is, the threshold is increased until the number of dots of the dot pattern extracted from the added image becomes equal to or less than the number of dots of the first dot pattern actually projected from the projection unit 12, and re-extraction is performed, thereby performing appropriate pattern extraction.

Figure 12:
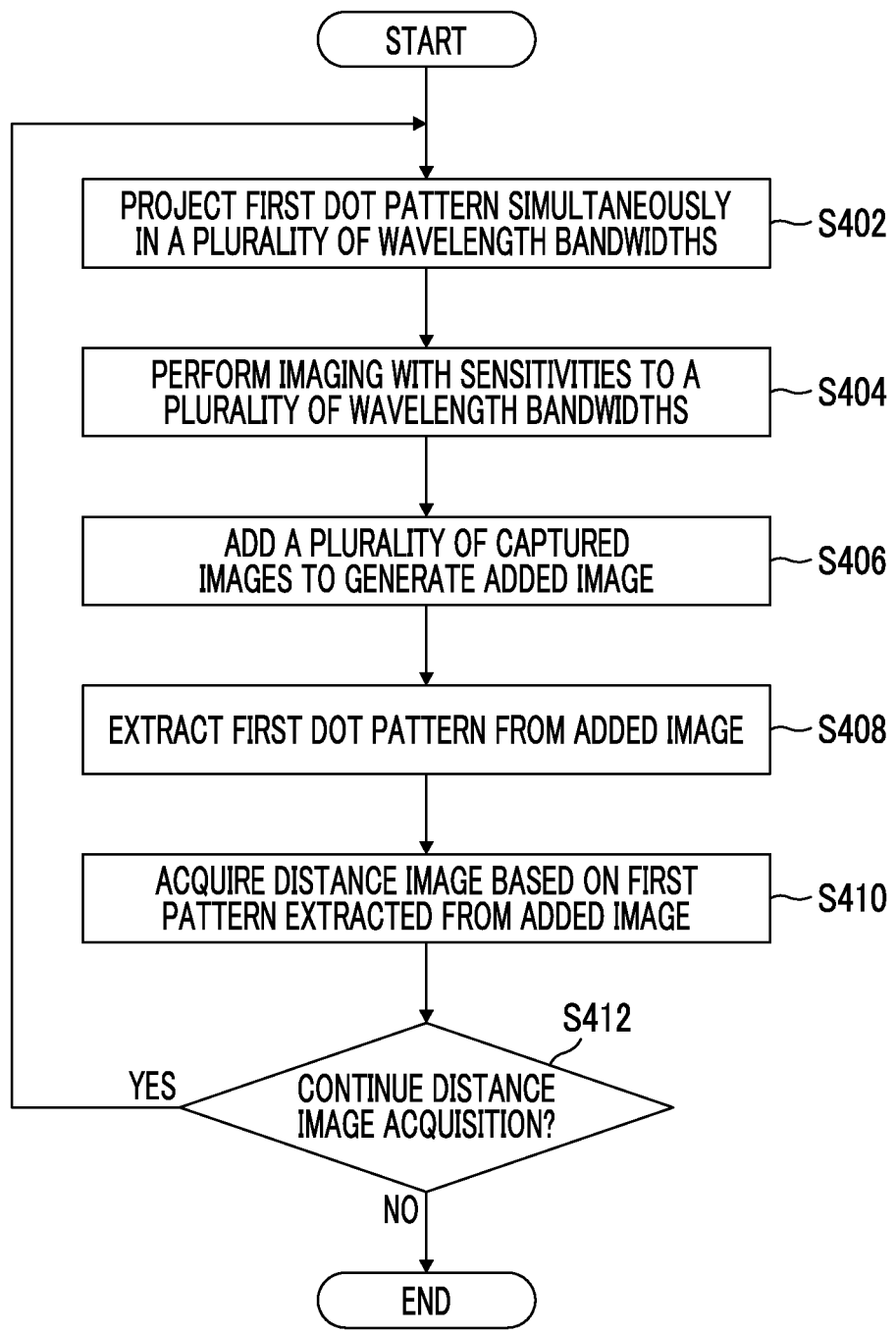
FIG. 12 is a flowchart showing the flow of processing of an example of a distance image acquisition method in the third embodiment.

FIG. 12 is a flowchart showing the flow of processing of an example of a distance image acquisition method of the third embodiment, and primarily shows the flow of processing which is executed according to a program under the control of the CPU 20. This processing is the distance image acquisition processing in the video mode, and for example, starts in a case where the shutter button 11 is operated with one push.

Steps S402 and S404 are respectively the same as Steps S202 and S204 of the processing of the first embodiment shown in FIG. 8. The outline will be described. The projection unit 12 projects the first dot pattern simultaneously in a plurality of wavelength bandwidths corresponding to the number of wavelength bandwidths N (Step S402), and the imaging unit 14 performs imaging with sensitivities to a plurality of wavelength bandwidths corresponding to the number of wavelength bandwidths N to generate a plurality of captured images including the first dot pattern reflected from the subject and corresponding to a plurality of wavelength bandwidths (Step S404).

Next, the added image generation unit 20D adds a plurality of captured images (from the captured image in the first wavelength bandwidth to the captured image in the N-th wavelength bandwidth) to generate the added image (Step S406). That is, the added image generation unit 20D adds the pixel values of the pixels at the corresponding pixel positions over a plurality of captured images corresponding to the number of wavelength bandwidths N to generate the added image constituted of the added value.

Next, the pattern extraction unit 20A extracts the first dot pattern from the added image (Step S408).

Next, the distance image acquisition unit 20B acquires the distance image based on the first dot pattern extracted from the added image (Step S410).

Next, the CPU 20 determines whether or not to continue the distance image acquisition (Step S412), and in a case where it is determined to continue the distance image acquisition (in a case where the determination result in Step S412 is YES), repeats Steps S402 to S412. In a case where it is determined not to continue the distance image acquisition (in a case where the determination result in Step S412 is NO), this processing ends. This processing is the distance image acquisition in the video mode, and ends in a case where the shutter button 11 is operated with one push again.

In FIG. 12, for ease of understanding of this embodiment, although a case where the dot pattern is projected in a plurality of wavelength bandwidths from the start to the end of the distance image acquisition processing has been described as an example, the invention is not limited to such a case. It is preferable that, first, the dot pattern is projected from the projection unit 12 in one wavelength bandwidth, in a case where the determination unit 20C determines that the second dot pattern is not included in a captured image in one wavelength bandwidth (that is, in a case where it is determined that the second dot pattern is not projected from the another apparatus), the distance image is acquired based on the first dot pattern extracted from the captured image in one wavelength bandwidth, and in a case where the determination unit 20C determines that the second dot pattern is included in the captured image in one wavelength bandwidth (that is, in a case where it is determined that the second dot pattern is projected from another apparatus), the first dot pattern is projected from the projection unit 12 by switching one wavelength bandwidth to a plurality of wavelength bandwidths, the added image is generated, and the distance image is generated based on the dot pattern extracted from the added image.

<Variation of Aspect That Imaging is Performed in a Plurality of Wavelength Bandwidths>

The imaging unit in the invention is not particularly limited to the imaging unit 14 (an example of the imaging unit having a plurality of types of light receiving elements with sensitivities to a plurality of wavelength bandwidths) shown in FIG. 6.

Figure 13:
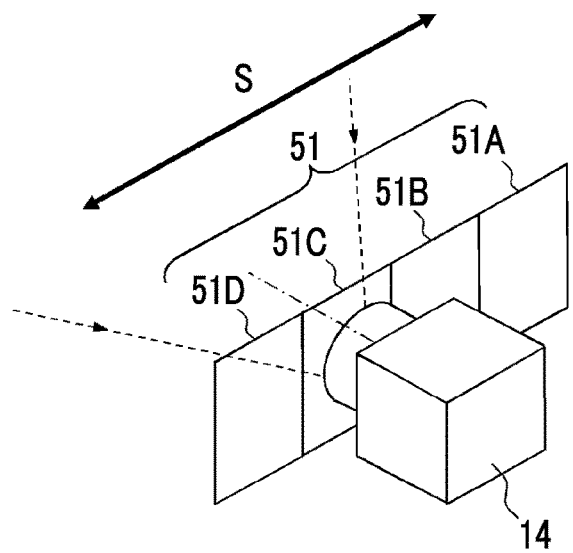
FIG. 13 is a diagram illustrating an example of a transmission wavelength bandwidth switching device.

For example, a transmission wavelength bandwidth switching device 51 illustrated in FIG. 13 may be used. The transmission wavelength bandwidth switching device 51 of this example has a configuration in which a plurality of transmission filters 51A, 51B, 51C, and 51D having different transmission wavelength bandwidths are arranged linearly in a direction S orthogonal to an optical axis direction of the imaging unit 14. The CPU 20 makes the transmission wavelength bandwidth switching device 51 slide in the direction S through a drive mechanism (not shown) to switch the transmission wavelength bandwidth of light entering the imaging unit 14. That is, the CPU 20 functions as a transmission wavelength bandwidth control unit which switches the transmission wavelength bandwidth of light entering the imaging unit 14 with the transmission wavelength bandwidth switching device 51 to make the imaging unit 14 perform imaging with sensitivities to a plurality of wavelength bandwidths.

In a case where the transmission wavelength bandwidth switching device 51 of this example is used, the light modulation unit 22 makes the first dot pattern be projected from the projection unit 12 sequentially in a plurality of wavelength bandwidths. The imaging unit 14 performs imaging with a sensitivity only to the wavelength bandwidth of the first dot pattern being projected from the projection unit 12 among a plurality of wavelength bandwidths in synchronization with switching of the wavelength bandwidths in the light modulation unit 22. That is, imaging is performed in the above-described second imaging mode.

Although a case where a plurality of transmission filters 51A, 51B, 51C, and 51D are arranged linearly and are made to slide has been described as an example, the invention is not limited to such a case. For example, a transmission wavelength bandwidth switching device in which a plurality of transmission filters are arranged annularly may be rotated.

Although a case where the transmission filter is selected by the drive mechanism has been described, the invention is not limited to such a case. A device which optically switches the wavelength of light entering the imaging unit 14 may be used as a transmission wavelength bandwidth switching device.

An aspect to which the invention is applicable is not limited to a distance image acquisition apparatus having a single function of acquiring a distance image, and a general digital camera or a video camera which can capture a color image may have a distance image acquisition function. The invention is also applicable to mobile apparatuses which have, in addition to a distance image acquisition function, functions (a call handling function, a communication function, and other computer functions) other than the distance image acquisition function. As other aspects to which the invention is applicable, for example, mobile phones, smartphones, personal digital assistants (PDA), and portable game machines are exemplified. Hereinafter, an example of a smartphone to which the invention is applicable will be described.

<Configuration of Smartphone>

Figure 14:
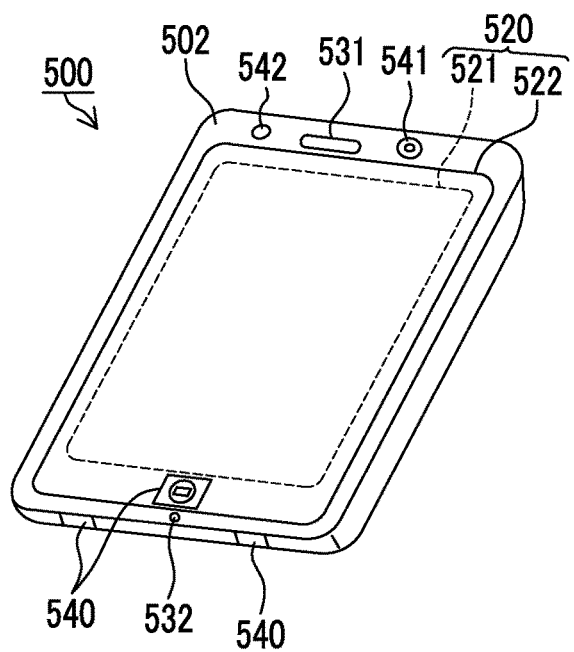
FIG. 14 is an appearance diagram of a smartphone which is an example of the distance image acquisition apparatus.

FIG. 14 is a perspective view showing the appearance of a smartphone 500 which is an embodiment of a distance image acquisition apparatus.

The smartphone 500 shown in FIG. 14 has a flat plate-shaped housing 502, and comprises a display input unit 520 in which a display panel 521 as a display unit and an operation panel 522 as an input unit are integrated on one surface of the housing 502. The housing 502 comprises a speaker 531, a microphone 532, an operating unit 540, a camera unit 541, and a projection unit 542. The configuration of the housing 502 is not limited thereto, and for example, a configuration in which the display unit and the input unit are independent from each other may be employed, or a configuration having a folding structure or a slide mechanism may be employed.

Figure 15:
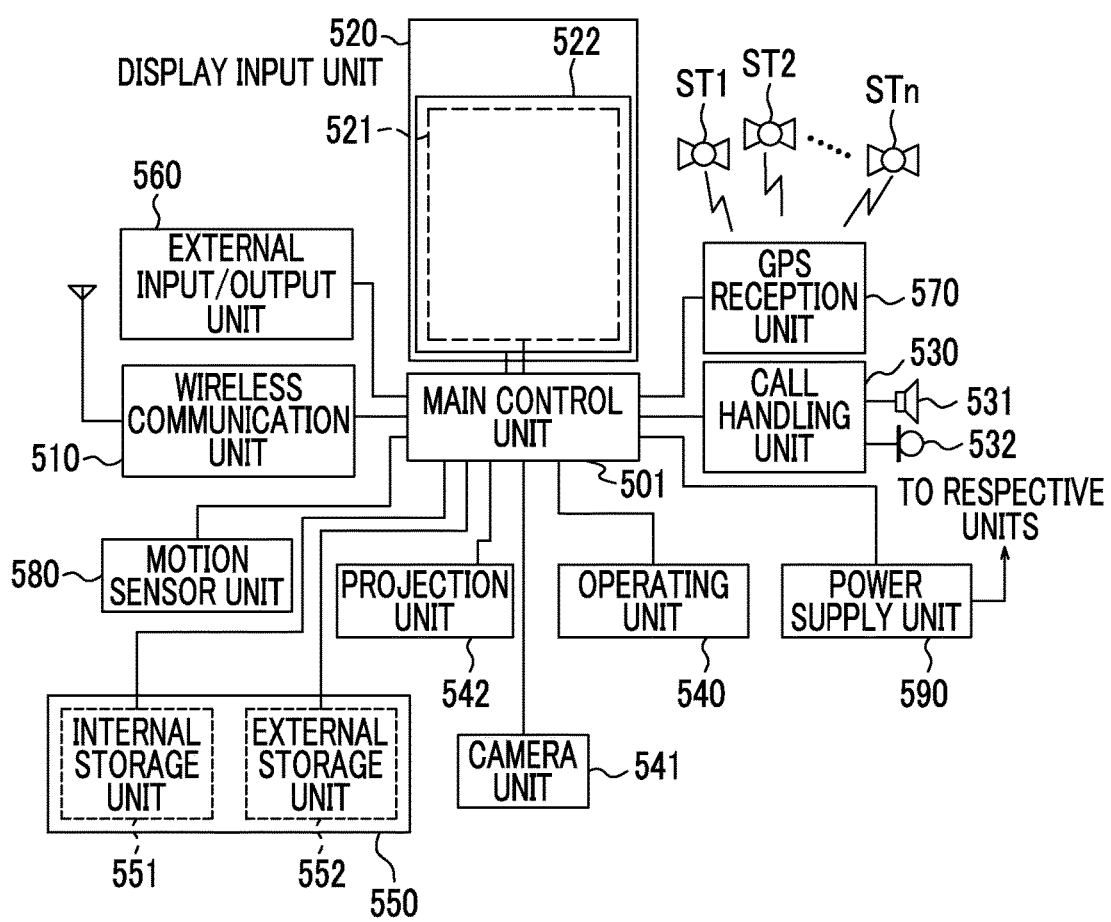
FIG. 15 is a block diagram showing the configuration of the smartphone.

FIG. 15 is a block diagram of the smartphone 500 shown in FIG. 14. As shown in FIG. 15, the smartphone 500 comprises, as principal components, a wireless communication unit 510, a display input unit 520, a call handling unit 530, an operating unit 540, a camera unit 541 functioning as an imaging unit, a storage unit 550, an external input/output unit 560, a global positioning system (GPS) reception unit 570, a motion sensor unit 580, a power supply unit 590, and a main control unit 501. The smartphone 500 has, as a principal function, a wireless communication function of performing mobile wireless communication through a base station device and a mobile communication network.

The wireless communication unit 510 performs wireless communication with the base station device in the mobile communication network according to an instruction of the main control unit 501. With the use of the wireless communication, transmission and reception of various kinds of file data, such as music data and image data, and electronic mail data, or reception of Web data, streaming data, or the like is performed.

The display input unit 520 is a so-called touch panel which displays images (static images and video), text information, or the like to visually transfer information to the user and detects a user's operation on the displayed information under the control of the main control unit 501, and comprises the display panel 521 and the operation panel 522. In a case where a generated three-dimensional image is viewed, it is preferable that the display panel 521 is a three-dimensional display panel.

The display panel 521 uses a liquid crystal display (LCD), an organic electro-luminescence display (OELD), or the like as a display device.

The operation panel 522 is a device which is placed such that an image displayed on a display surface of the display panel 521 is visible, and detects one or a plurality of coordinates according to an operation with a user's finger or a stylus. In a case where the device is operated with the user's finger or the stylus, a detection signal generated due to the operation is output to the main control unit 501. Next, the main control unit 501 detects an operation position (coordinates) on the display panel 521 based on the received detection signal.

As shown in FIG. 14, although the display panel 521 and the operation panel 522 of the smartphone 500 are integrated to constitute the display input unit 520, the operation panel 522 is arranged so as to completely cover the display panel 521. In a case where this arrangement is employed, the operation panel 522 may have a function of detecting a user's operation even in a region outside the display panel 521. In other words, the operation panel 522 may have a detection region (hereinafter, referred to as a display region) for a superimposed portion overlapping the display panel 521 and a detection region (hereinafter, referred to as a non-display region) for an outer edge portion not overlapping the display panel 521 other than the display region.

Although the size of the display region may completely coincide with the size of the display panel 521, both of the size of the display region and the size of the display panel 521 are not necessarily made to coincide with each other. The operation panel 522 may have two sensitive regions including an outer edge portion and an inner portion other than the outer edge portion. The width of the outer edge portion is appropriately designed according to the size of the housing 502 or the like. As a position detection system which is employed in the operation panel 522, a matrix switching system, a resistive film system, a surface acoustic wave system, an infrared system, an electromagnetic induction system, an electrostatic capacitance system, and the like are exemplified, and any system may be employed.

The call handling unit 530 comprises the speaker 531 and the microphone 532, converts speech of the user input through the microphone 532 to speech data processable in the main control unit 501 and outputs speech data to the main control unit 501, or decodes speech data received by the wireless communication unit 510 or the external input/output unit 560 and outputs speech from the speaker 531. As shown in FIG. 14, for example, the speaker 531 and the microphone 532 can be mounted on the same surface as the surface on which the display input unit 520 is provided.

The operating unit 540 is a hardware key using a key switch or the like, and receives an instruction from the user. For example, the operating unit 540 is a push button type switch which is mounted on a lower surface below the display unit of the housing 502 of the smartphone 500, and is turned on in a case of being pressed with a finger or the like and is brought into an off state by restoration force of the panel or the like in a case where the finger is released.

The storage unit 550 stores a control program or control data of the main control unit 501, address data associated with the name, telephone number, and the like of a communication partner, data of transmitted and received electronic mail, Web data downloaded by Web browsing, and downloaded content data, and temporarily stores streaming data or the like. The storage unit 550 is constituted of an internal storage unit 551 embedded in the smartphone and an external storage unit 552 having a slot for a detachable external memory. Each of the internal storage unit 551 and the external storage unit 552 constituting the storage unit 550 is realized using a memory (for example, a Micro SD (Registered Trademark) memory), such as a flash memory type, a hard disk type, a multimedia card micro type, or a card type, or a storage medium, such as a random access memory (RAM) or a read only memory (ROM).

The external input/output unit 560 plays a role of an interface with all external devices connected to the smartphone 500, and is provided for direct or indirect connection to other external devices through communication or the like (for example, a universal serial bus or the like) or network (for example, the Internet, a wireless local area network (LAN), Bluetooth (Registered Trademark), radio frequency identification (RFID), infrared data association (IrDA), Ultra Wideband (UWB) (Registered Trademark), ZigBee (Registered Trademark), or the like).

The external devices connected to the smartphone 500 are, for example, a wired/wireless headset, a wired/wireless external charger, a wired/wireless data port, a memory card, a subscriber identity module (SIM) card, or a user identity module (UIM) card connected through a card socket, an external audio-video device connected through an audio-video input/output (I/O) terminal, an external audio-video device connected in a wireless manner, a smartphone connected in a wired or wireless manner, a personal computer connected in a wired/wireless manner, a PDA connected in a wired/wireless manner, an earphone, and the like. The external input/output unit can transfer data transmitted from the external devices to the respective components in the smartphone 500 or can transmit data in the smartphone 500 to the external devices.

The GPS reception unit 570 receives GPS signals transmitted from GPS satellites ST1 to STn according to an instruction of the main control unit 501, executes positioning calculation processing based on a plurality of received GPS signals, and detects the position of the smartphone 500 having latitude, longitude, and altitude. When position information can be acquired from the wireless communication unit 510 or the external input/output unit 560 (for example, a wireless LAN), the GPS reception unit 570 can detect the position using the position information.

The motion sensor unit 580 comprises, for example, a three-axis acceleration sensor or the like, and detects physical motion of the smartphone 500 according to an instruction of the main control unit 501. The moving direction or acceleration of the smartphone 500 is detected by detecting physical motion of the smartphone 500. The detection result is output to the main control unit 501.

The power supply unit 590 supplies electric power stored in a battery (not shown) to the respective units of the smartphone 500 according to an instruction of the main control unit 501.

The main control unit 501 is provided with a microprocessor, operates according to the control program or control data stored in the storage unit 550, and integrally controls the respective units of the smartphone 500. The main control unit 501 has a mobile communication control function of controlling respective units of a communication system in order to perform speech communication or data communication through the wireless communication unit 510, and an application processing function.

The application processing function is realized by the main control unit 501 operating according to application software stored in the storage unit 550. The application processing function is, for example, an infrared communication function of controlling the external input/output unit 560 to perform data communication with a device facing the smartphone 500, an electronic mail function of transmitting and receiving electronic mail, a Web browsing function of browsing Web pages, or the like.

The main control unit 501 has an image processing function of displaying video on the display input unit 520, or the like based on image data (static image or video data), such as received data or downloaded streaming data. The image processing function refers to a function of the main control unit 501 decoding image data, performing image processing on the decoding result, and displaying an image on the display input unit 520.

The main control unit 501 executes display control on the display panel 521 and operation detection control for detecting a user's operation through the operating unit 540 and the operation panel 522.

With the execution of the display control, the main control unit 501 displays an icon for activating application software or a software key, such as a scroll bar, or displays a window for creating electronic mail. The scroll bar refers to a software key for receiving an instruction to move a display portion of an image which is too large to fit into the display area of the display panel 521.

With the execution of the operation detection control, the main control unit 501 detects a user's operation through the operating unit 540, receives an operation on the icon or an input of text in an entry column of the window through the operation panel 522, or receives a scroll request of a display image through the scroll bar.

In addition, with the execution of the operation detection control, the main control unit 501 has a touch panel control function of determining whether or not an operation position on the operation panel 522 is the superimposed portion (display region) overlapping the display panel 521 or the outer edge portion (non-display region) not overlapping the display panel 521 other than the display region, and controlling the sensitive region of the operation panel 522 or the display position of the software key.

The main control unit 501 may detect a gesture operation on the operation panel 522 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 541 is an imaging device which performs electronic imaging using an image sensor, such as a complementary metal oxide semiconductor (CMOS) or a charge-coupled device (CCD).

In this case, it is preferable that the camera unit 541 has a plurality of light receiving elements having different wavelength bandwidths from each other provided in one image sensor, and light receiving elements (R pixel, G pixel, and B pixel) for color imaging mixed and arranged in a two-dimensional manner. That is, as an image sensor of the camera unit 541, an image sensor in which an R pixel, a G pixel, and a B pixel provided with color filters of RGB for color imaging and a pixel (a pixel having a sensitivity only to projection light) provided with a band-pass filter or a cut filter for distance image acquisition are mixed is preferably used.

The projection unit 542 has an LED, and projects a first dot pattern of light at the time of acquisition of the distance image. In a case of the smartphone 500 having an optical communication function, the LED can be used as a light source of optical communication.

Under the control of the main control unit 501, the camera unit 541 can convert image data of visible light obtained by imaging to compressed image data in a format of, for example, Joint Photographic coding Experts Group (JPEG) or the like and can record compressed image data in the storage unit 550 or can output compressed image data through the external input/output unit 560 or the wireless communication unit 510, and similarly, can record the distance image indicating the distance of the subject in the storage unit 550 or can output the distance image through the external input/output unit 560 or the wireless communication unit 510. In the smartphone 500 shown in FIG. 14, although the camera unit 541 is mounted on the same surface as the display input unit 520, the mounting position of the camera unit 541 is not limited thereto, and the camera unit 541 may be mounted on a rear surface of the display input unit 520, or a plurality of camera units 541 may be mounted. In a case where a plurality of camera units 541 are mounted, the camera unit 541 for imaging may be switched to perform imaging alone, or a plurality of camera units 541 may be used simultaneously to perform imaging.

The camera unit 541 can be used for various functions of the smartphone 500. For example, an image acquired by the camera unit 541 can be displayed on the display panel 521, or an image in the camera unit 541 can be used as one operation input of the operation panel 522. In a case where the GPS reception unit 570 detects the position, the position may be detected with reference to an image from the camera unit 541. In addition, the optical axis direction of the camera unit 541 of the smartphone 500 may be determined or a current use environment may be determined with reference to an image from the camera unit 541 without using the three-axis acceleration sensor or using the three-axis acceleration sensor. Of course, an image from the camera unit 541 may be used within application software.

For example, the projection unit 542 may constitute a projection unit in the invention. For example, the camera unit 541 may constitute an imaging unit in the invention. For example, the main control unit 501 may constitute a determination unit, a pattern extraction unit, a distance image acquisition unit, and an added image generation unit in the invention. Though not shown, a light modulation unit and a beacon information reception unit in the invention are provided in the smartphone 500.

The invention is not particularly limited to a case (video mode) of acquiring the continuous distance image, and can be carried out in a case (static image mode) of performing distance image acquisition for one frame.

The invention is not limited to the above-described embodiments, and it is needless to say that various modifications can be made without departing from the spirit of the invention.

EXPLANATION OF REFERENCES

10, 100: distance image acquisition apparatus, 12: projection unit, 14: imaging unit, 16: AD converter, 18: interface circuit, 20: CPU, 20A: pattern extraction unit, 20B: distance image acquisition unit, 20C: determination unit, 20D: added image generation unit, 22: light modulation unit, 26: drive unit, 28: operating unit, 30: communication unit, 32: storage unit, 51: transmission wavelength bandwidth switching device

What is claimed is:

1. A distance image acquisition apparatus comprising:
  a projector which projects a first pattern of structured light distributed in a two-dimensional manner with respect to a subject within a distance measurement region in a plurality of wavelength bandwidths;
  a camera which is provided in parallel with and apart from the projector by a baseline length, performs imaging with sensitivities to the plurality of wavelength bandwidths, and generates a plurality of captured images including the first pattern reflected from the subject and corresponding to the plurality of wavelength bandwidths; and
  a processor configured to:
    determine whether or not a second pattern of structured light projected from another distance image acquisition apparatus is included in the captured images;
    extract the first pattern from at least a captured image determined as the second pattern being not included; and
    acquire a distance image indicating a distance of the subject within the distance measurement region based on the first pattern extracted,
  wherein the first pattern and the second pattern are dot patterns, and
  in a case where the number of dots of a dot pattern in the captured image exceeds the number of dots of the first pattern projected from the projector, the processor determines that the second pattern is included in the captured image.

2. The distance image acquisition apparatus according to claim 1,
  wherein the processor determines that the second pattern is included in a captured image in a wavelength bandwidth indicated by beacon information, which is received at the distance image acquisition apparatus, the beacon information indicating the wavelength bandwidth of projection of the second pattern from the another distance image acquisition apparatus.

3. The distance image acquisition apparatus according to claim 1, further comprising:
  a light modulator which makes the first pattern be projected from the projector sequentially in the plurality of wavelength bandwidths,
  wherein the camera performs imaging with a sensitivity only to a wavelength bandwidth of the first pattern during projection from the projector among the plurality of wavelength bandwidths in synchronization with switching of the wavelength bandwidths in the light modulator.

4. The distance image acquisition apparatus according to claim 1,
  wherein the projector projects the first pattern simultaneously in the plurality of wavelength bandwidths.

5. The distance image acquisition apparatus according to claim 1,
  wherein the camera has a plurality of types of light receiving elements having sensitivities to the plurality of wavelength bandwidths.

6. The distance image acquisition apparatus according to claim 1, further comprising:
  a transmission wavelength bandwidth switching device which switches a transmission wavelength bandwidth of light entering the camera; and
  a transmission wavelength bandwidth control unit which switches the transmission wavelength bandwidth of light entering the camera with the transmission wavelength bandwidth switching device to make the camera perform imaging with sensitivities to the plurality of wavelength bandwidths.

7. A distance image acquisition method comprising:
  projecting a first pattern of structured light distributed in a two-dimensional manner with respect to a subject within a distance measurement region from a projector in a plurality of wavelength bandwidths;
  performing imaging with sensitivities to the plurality of wavelength bandwidths with an camera provided in parallel with and apart from the projector by a baseline length, and generating a plurality of captured images including the first pattern reflected from the subject and corresponding to the plurality of wavelength bandwidths;
  determining whether or not a second pattern of structured light projected from another distance image acquisition apparatus is included in the captured images;
  extracting the first pattern from at least a captured image determined as the second pattern being not included; and
  acquiring a distance image indicating a distance of the subject within the distance measurement region based on the extracted first pattern; and
  in a case where the number of dots of a dot pattern in the captured image exceeds the number of dots of the first pattern projected from the projector, determining that the second pattern is included in the captured image,
  wherein the first pattern and the second pattern are dot patterns.

* * * * *